US007359996B2

(12) United States Patent
Saito et al.

(10) Patent No.: US 7,359,996 B2
(45) Date of Patent: Apr. 15, 2008

(54) DATA TRANSFER CONTROL DEVICE, ELECTRONIC EQUIPMENT, AND DATA TRANSFER CONTROL METHOD

(75) Inventors: Nobuyuki Saito, Sapporo (JP);
Shinsuke Kubota, Sapporo (JP);
Hironobu Kazama, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 1140 days.

(21) Appl. No.: 10/377,764

(22) Filed: Mar. 4, 2003

(65) Prior Publication Data
US 2004/0017772 A1  Jan. 29, 2004

(30) Foreign Application Priority Data
Apr. 19, 2002  (JP) .............................. 2002-118180

(51) Int. Cl.
*G06F 13/28* (2006.01)
(52) U.S. Cl. ....................................................... 710/25
(58) Field of Classification Search .................. None
See application file for complete search history.

(56) References Cited

U.S. PATENT DOCUMENTS

| 5,974,486 A | * | 10/1999 | Siddappa ...................... 710/53 |
| 6,105,097 A | | 8/2000 | Larky et al. |
| 6,298,403 B1 | * | 10/2001 | Suri et al. ..................... 710/100 |

FOREIGN PATENT DOCUMENTS

| JP | A 05-289936 | 11/1993 |
| JP | A 10-171713 | 6/1998 |
| JP | A 10-301898 | 11/1998 |
| JP | A 2000-222286 | 8/2000 |
| JP | A 2001-273191 | 10/2001 |
| JP | A 2001-358733 | 12/2001 |
| JP | A 2002-009849 | 1/2002 |
| JP | A 2002-055936 | 2/2002 |
| JP | A 2002-064506 | 2/2002 |
| JP | A 2002-091717 | 3/2002 |
| JP | A 2002-111748 | 4/2002 |
| JP | A 2002-116998 | 4/2002 |

OTHER PUBLICATIONS

"USB On-The-Go Implementation" by Zong Liang Wu pp. 1-25 dated Nov. 9, 2001.
Saito, Nobuyuki, "OTG Controller LSI Taking Reduction of CPU Load Into Consideration", pp. 82-88 and 166 w/ English Abstract.

* cited by examiner

*Primary Examiner*—Alford Kindred
*Assistant Examiner*—Jasjit Vidwan
(74) *Attorney, Agent, or Firm*—Oliff & Berridge, PLC

(57) ABSTRACT

Pipe regions PIPE0 to PIPEe (or endpoint regions) are allocated in a packet buffer, registers in which are set page sizes MPS0 to MPe (maximum packet size) and numbers of pages BP0 to BPe for the pipe regions are provided, and data is transferred between pipe regions and endpoints, region sizes RS0 to RSe of the pipe regions being set by the page sizes and numbers of pages. The page sizes and numbers of pages are set in registers that are used in common during both host operation and peripheral operation in accordance with the USB on-the-go standard. Transfer condition information such as transfer types TT0 to TTe is set in the registers, transactions with respect to the endpoints are automatically issued, and data is automatically transferred. Pipe regions are allocated in the packet buffer during host operation whereas endpoint regions are allocated during peripheral operation.

11 Claims, 26 Drawing Sheets

MINI-A PLUG   USB CABLE   MINI-B PLUG

A-DEVICE (DEFAULT HOST)   B-DEVICE (DEFAULT PERIPHERAL)

B-DEVICE (DEFAULT PERIPHERAL)   A-DEVICE (DEFAULT HOST)

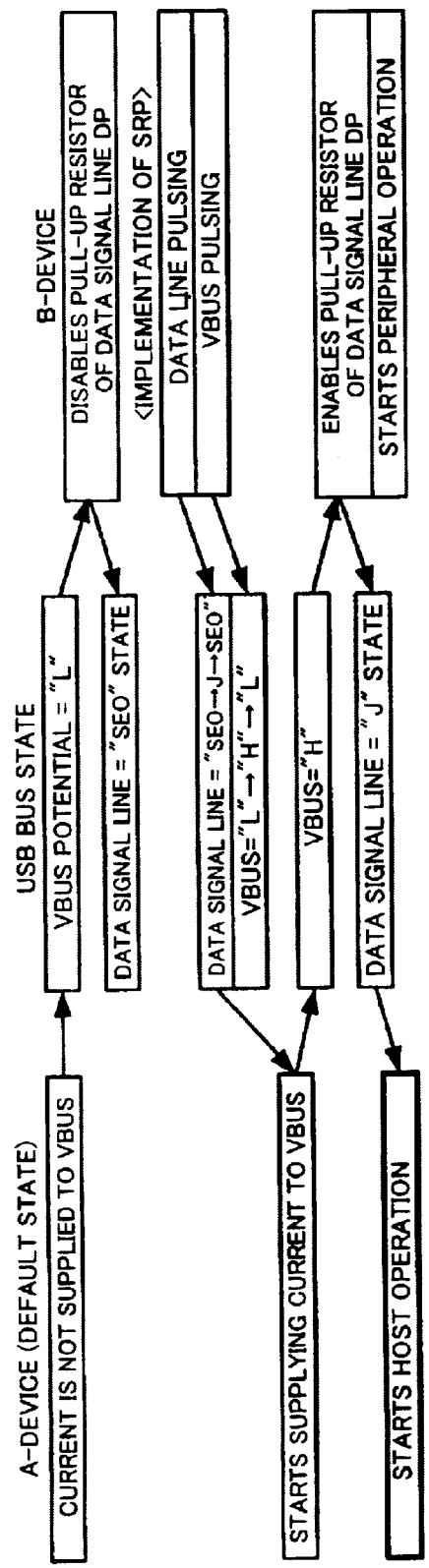
FIG. 2A  SRP (SESSION REQUEST PROTOCOL)
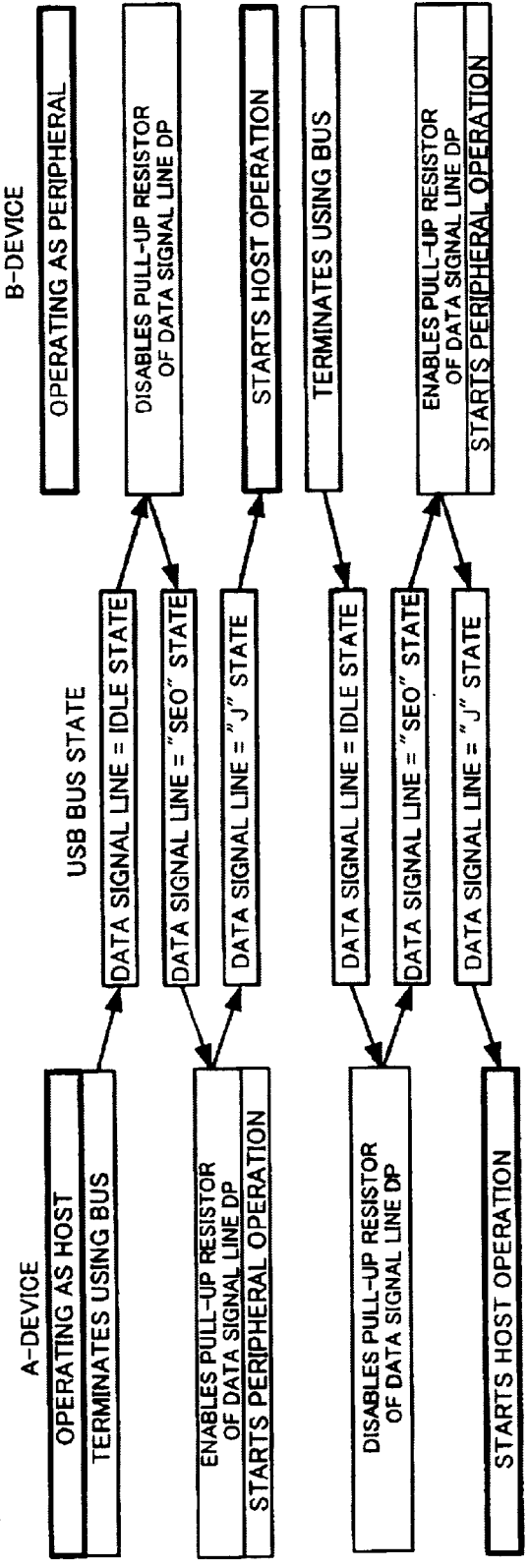
FIG. 2B  HNP (HOST NEGOTIATION PROTOCOL)

LIST STRUCTURE TYPE DESCRIPTOR

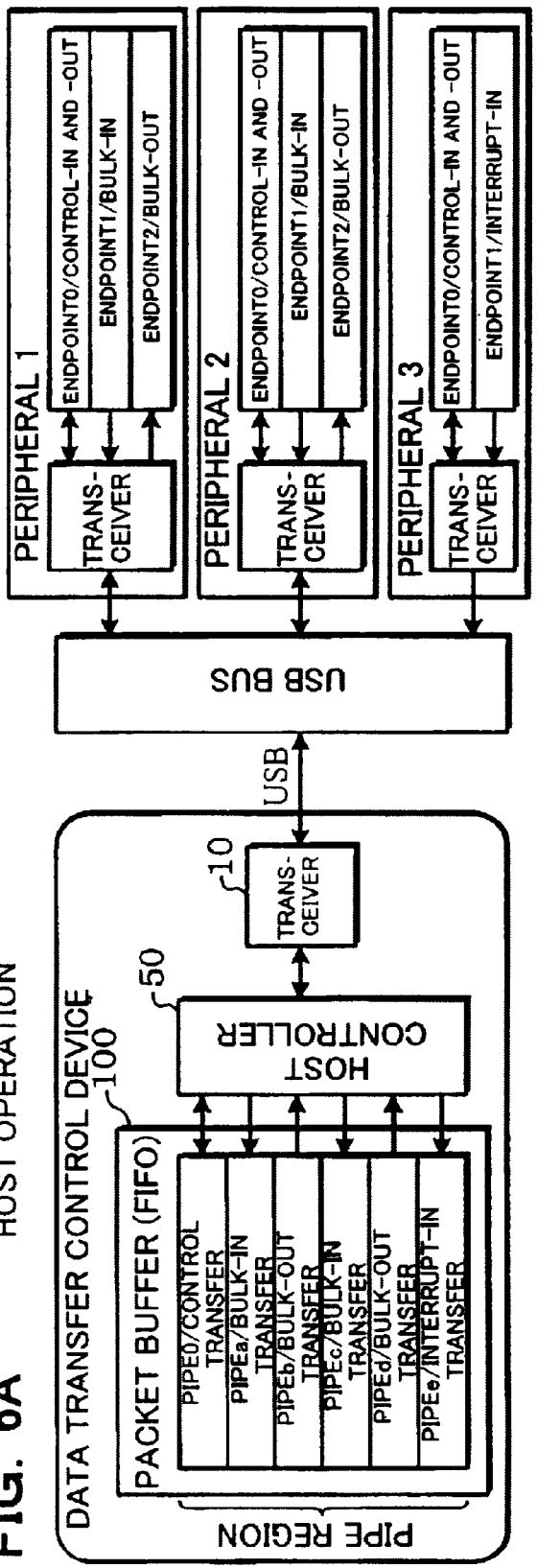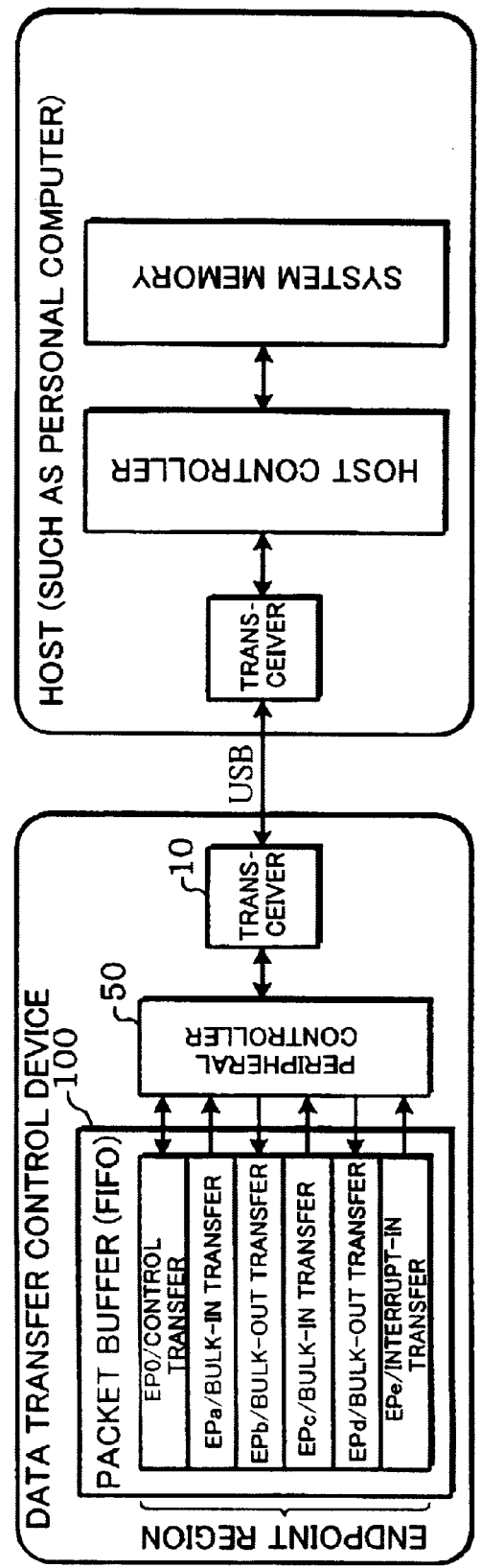

FIG. 10
DURING HOST OPERATION
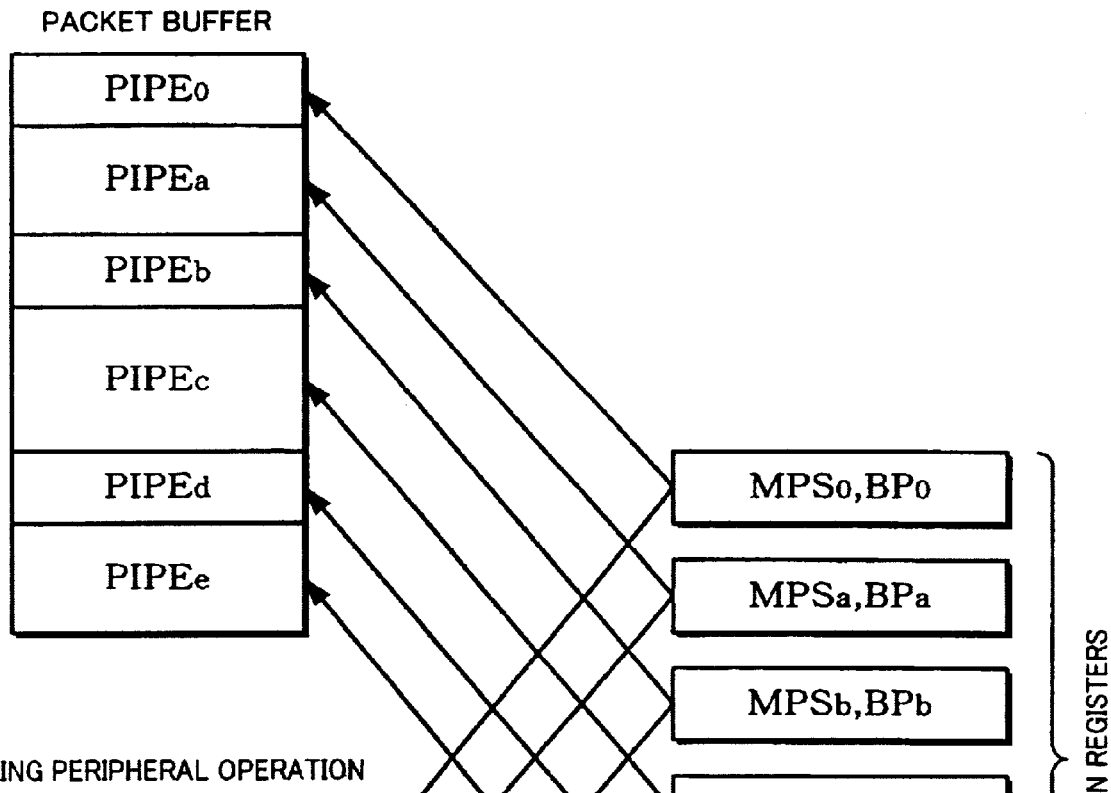
DURING PERIPHERAL OPERATION
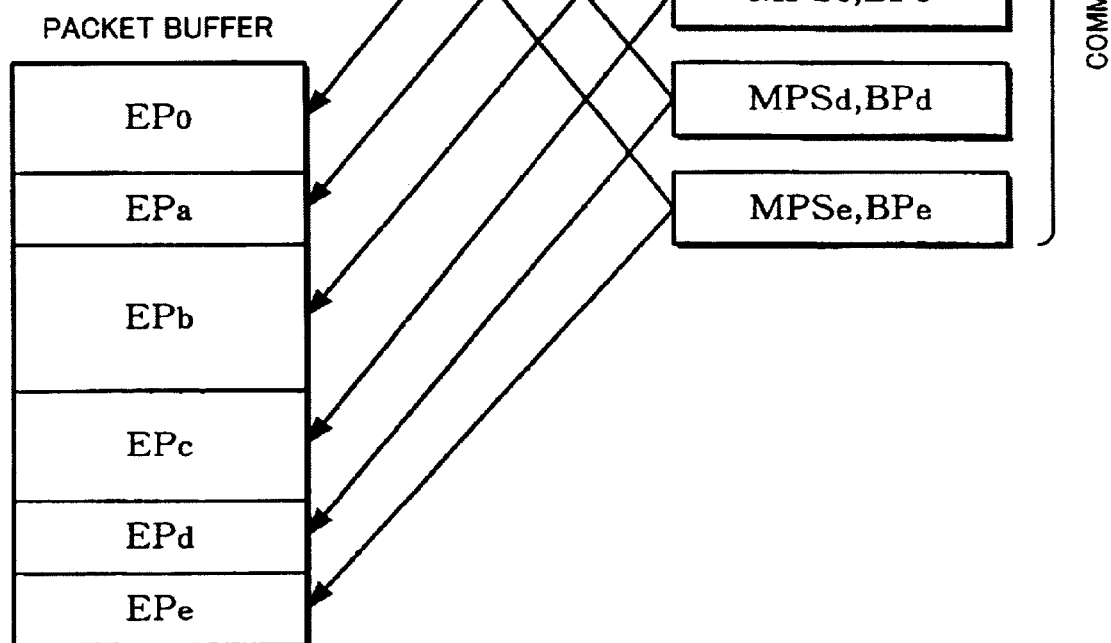

REGION ALLOCATION

| PIPE/EP | MaxPktSize | BufferPag |
|---|---|---|
| 0 | 8 | 1 |
| a | 64 | 2 |
| b | 64 | 3 |
| c | 0 | 0 |
| d | 32 | 2 |
| e | 64 | 1 |

HOST OPERATION

PERIPHERAL OPERATION

FIG. 15

REGISTER SECTION

| | | |
|---|---|---|
| TRANSFER CONDITION REGISTERS (PIPE/EP CONTROL REGISTERS) (0, a TO e) | HC/PC (PIPE/EP) COMMON REGISTERS | REGISTERS USED BOTH DURING HOST OPERATION (PIPE) AND PERIPHERAL OPERATION (EP) | DATA TRANSFER DIRECTION, TRANSFER TYPE, END POINT NUMBER, MAXIMUM PACKET SIZE, NUMBER OF PAGES, PRESENCE/ABSENCE OF DMA CONNECTION, ETC. |
| | HC (PIPE) REGISTERS | REGISTERS USED ONLY DURING HOST OPERATION (PIPE) | INTERRUPT TRANSFER TOKEN ISSUE PERIOD, NUMBER OF TRANSACTION CONTINUOUS EXECUTIONS, FUNCTION ADDRESS, TOTAL SIZE OF TRANSFER DATA, AUTOMATIC TRANSACTION START INSTRUCTION, AUTOMATIC CONTROL TRANSFER MODE INSTRUCTION, ETC. |
| | PC (EP) REGISTERS | REGISTERS USED ONLY DURING PERIPHERAL OPERATION (EP) | END POINT ENABLE, HANDSHAKE SPECIFICATION, ETC. |
| | COMMON ACCESS CONTROL REGISTERS FOR PACKET BUFFER (FIFO) | REGISTERS ENABLING ACCESS CONTROL FOR PACKET BUFFER (FIFO) | BUFFER I/O PORT, BUFFER FULL/EMPTY, BUFFER REMAINING DATA SIZE, ETC. |
| INTERRUPT-RELATED REGISTERS | INTERRUPT STATUS REGISTER | REGISTER THAT INDICATES INTERRUPT STATUS (CAUSE) | OTGC-RELATED, HC (PIPE)-RELATED, PC (EP)-RELATED, ETC. |
| | INTERRUPT ENABLE REGISTER | REGISTER THAT SETS INTERRUPT ENABLE/DISABLE STATE | OTGC-RELATED, HC (PIPE)-RELATED, PC (EP)-RELATED, ETC. |
| BLOCK-RELATED REGISTERS | INTER-BLOCK COMMON REGISTER | REGISTER USED IN COMMON BETWEEN BLOCKS | BLOCK RESET INSTRUCTION, ETC. |
| | BLOCK REGISTERS | REGISTERS USED WITHIN THE Xcvr, OTGC, HC, AND PC BLOCKS | Xcvr CONTROL, OTGC STATE COMMAND, HC STATE COMMAND, FRAME NUMBER, ETC. |
| DMA CONTROL REGISTER | — | REGISTER FOR SETTINGS RELATING TO DMA CONTROL | DMA TRANSFER START INSTRUCTION, TOTAL SIZE OF DMA TRANSFER DATA, ETC. |

HOST OPERATION

PERIPHERAL OPERATION

DATA TRANSFER CONTROL DEVICE, ELECTRONIC EQUIPMENT, AND DATA TRANSFER CONTROL METHOD

Japanese Patent Application No. 2002-118180, filed on Apr. 19, 2002, is hereby incorporated by reference in its entirety.

BACKGROUND

The present invention relates to a data transfer control device, electronic equipment, and a data transfer control method.

The universal serial bus (USB) standard 2.0 that supports high-speed (HS) mode is expanding well in the marketplace, but an interface standard called the USB On-The-Go (OTG) has been settled upon by the USB Implementers Forum (USB-IF). The OTG standard (OTG 1.0) that has been derived as an extension of USB 2.0 holds out the possibility of bringing new additional value to the USB interface, and it is expected that applications that make use of these characteristics will appear.

This OTG makes it possible to impart a host function to a peripheral (peripheral device) connected to a host (such as a personal computer) by existing USB. This makes it possible to transfer data between peripherals connected by USB, enabling direct connection between a digital camera and a printer, by way of example, so that an image from the digital camera can be printed. It is also possible to connect a digital camera or digital video camera to a storage device, to save data therein.

However, it is usual for a peripheral that is given the host function by OTG to have a limited-capability CPU (processing section) incorporated therein. The addition of the host function therefore places a heavy processing load on the CPU (firmware) of the peripheral, making processing complicated and raising further problems such as impeding other processes and lengthening the design period of the device.

If the possession of the host function due to OTG were to increase the size of the data transfer control device, this would lead to an increase in the cost of the data transfer control device and also an increase in the cost of the appliance (electronic equipment) containing such a data transfer control device.

The thus-configured data transfer control device is provided with a packet buffer in which is stored transfer data, but the scale of this packet buffer is generally relatively large. An important technical challenge is therefore how to utilize the resources of that packet buffer efficiently.

SUMMARY

One aspect of the present invention relates to a data transfer control device for data transfer over a bus, the data transfer control device comprising:

a buffer controller which controls access to a packet buffer including a plurality of pipe regions, each of the pipe regions being allocated to corresponding one of a plurality of endpoints, and data to be transferred to or from corresponding one of the endpoints being stored in the pipe regions;

a register section which includes a plurality of registers, a page size and a number of pages of each of the pipe regions being set in corresponding one of the registers; and a transfer controller which transfers data between each of the pipe regions and corresponding one of the endpoints, a region size of each of the pipe regions being set by the page size and the number of pages.

Another aspect of the present invention relates to a data transfer control device for data transfer over a bus; the data transfer control device comprising:

a buffer controller which controls access to a packet buffer having a plurality of endpoint regions, data to be transferred to or from a host being stored in the endpoint regions;

a register section which includes a plurality of registers, a page size and a number of pages of each of the endpoint regions being set in corresponding one of the registers; and a transfer controller which transfers data between the host and the endpoint regions, a region size of each of the endpoint regions being set by the page size and the number of pages.

BRIEF DESCRIPTION OF THE SEVERAL VIEWS OF THE DRAWING

FIGS. 2A and 2B are illustrative of the SRP and HNP protocols.

FIGS. 6A and 6B are illustrative of pipe regions and endpoint regions.

FIG. 10 is illustrative of a method of using registers in which a maximum packet size and a number of pages are set, during both host operation and peripheral operation.

FIG. 15 is illustrative of the register section.

DETAILED DESCRIPTION OF THE EMBODIMENT

Figure 1A:
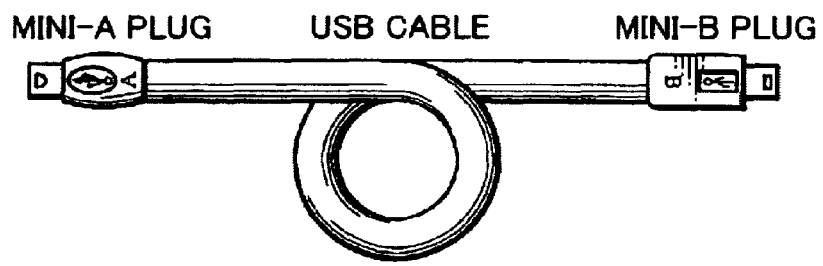
FIGS. 1A, 1B, and 1C are illustrative of the USB OTG standard.

Embodiments of the present invention are described below.

Note that the embodiments described hereunder do not in any way limit the scope of the invention defined by the claims laid out herein. Note also that all of the elements of these embodiments should not be taken as essential requirements to the means of the present invention.

An embodiment of the present invention relates to data transfer control device for data transfer over a bus, the data transfer control device comprising:

a buffer controller which controls access to a packet buffer including a plurality of pipe regions, each of the pipe regions being allocated to corresponding one of a plurality of endpoints, and data to be transferred to or from corresponding one of the endpoints being stored in the pipe regions;

a register section which includes a plurality of registers, a page size and a number of pages of each of the pipe regions being set in corresponding one of the registers; and a transfer controller which transfers data between each of the pipe regions and corresponding one of the endpoints, a region size of each of the pipe regions being set by the page size and the number of pages.

With this embodiment a plurality of pipe regions (buffer regions) is allocated for the packet buffer. In such a case, each pipe region is allocated to a corresponding endpoint of the bus. Data that is transferred (transmitted or received) to or from the corresponding endpoint is stored in each pipe region. The buffer controller performs access control (region management) over the packet buffer (buffer) in which these pipe regions are allocated.

With this embodiment, a page size and a number of pages (number of planes in the buffer) for setting the region size for each pipe region is set in the registers (pipe registers) of the register section. The transfer controller transfers data between a pipe region, which has a region size that is set by the page size and the number of pages that have been set in the registers, and the endpoint. This ensures that the resources of the packet buffer are utilized efficiently for data transfer.

This embodiment may further comprise a state controller which controls a plurality of states including a state of a host operation, in which the data transfer control device operates as a role of a host, and a state of a peripheral operation, in which the data transfer control device operates as a role of a peripheral, and the page size and the number of pages may be set in common registers that are used in common during the host operation and during the peripheral operation.

This embodiment makes it possible to provide both a state of the host operation and a state of the peripheral operation, making it possible to implement a dual-role device function. In addition, the registers in which the page sizes and numbers of pages are set can be used in common during the host operation and during the peripheral operation. This makes it possible to save on the resources of the register section and restrain the increase in size of the data transfer control device to a minimum, while enabling both the host operation and peripheral operation. Note that at least part of the register section could be divided between different blocks.

With this embodiment, during the host operation, a plurality of pipe regions may be allocated in the packet buffer, each of the pipe regions storing data to be transferred to or from corresponding one of the endpoints, and a page size and a number of pages of each of the pipe regions may be set in corresponding one of the common registers, and during the peripheral operation, a plurality of endpoint regions may be allocated in the packet buffer, each of the endpoint regions storing data to be transferred between each of the endpoint regions and the host, and a page size and a number of pages of each of the endpoint regions may be stored in corresponding one of the common registers.

This makes it possible to use the buffer regions of the packet buffer as pipe regions during the host operation and as endpoint regions during the peripheral operation. This promotes efficient utilization of the resources of the packet buffer and a reduction in the processing load on the processing section.

Note that the reading and writing of data with respect to the pipe regions (buffer regions) could be implemented by write pointers and read pointers set for each pipe region. Pointer information (position information) for the write pointers and read pointers could be stored in common registers corresponding to the pipe regions. During transmission in which data is transmitted to the bus and reception in which data is received from the bus, the assignment of write pointers and read pointers for access from the bus could be made to be different from the assignment of write pointers and read pointers for access from another bus.

With this embodiment, the register section may comprise a plurality of transfer condition registers, transfer condition information for data transfer between the pipe regions and the respective endpoints being set in the transfer condition registers, respectively, and the page size and the number of pages may be set in the transfer condition registers as the transfer condition information.

Note that the transfer condition registers could comprise common transfer condition registers that are used both during the host operation and during the peripheral operation, host transfer condition registers that are used during the host operation, and peripheral transfer condition registers that are used during the peripheral operation. In such a case, it is preferable that the page size and numbers of page are set in the common transfer condition registers.

With this embodiment, transfer type of a data transfer may be set in the transfer condition registers as the transfer condition information.

This ensures that the data in each pipe region can be transferred by an arbitrary type of data transfer (periodic transfers such as isochronous and interrupts or non-periodic transfers such as bulk and control).

With this embodiment, the transfer controller may automatically issue a transaction for each of the endpoints, based on the transfer condition information that has been set in the transfer condition registers, and may automatically transfer data between each of the pipe regions and corresponding one of the endpoints, a region size of each of the pipe regions being set by the page size and the number of pages.

This makes it possible to reduce the processing load on the processing section that performs processing such as control of the data transfer control device.

With this embodiment, when the processing section sets the page size and the number of pages in the registers in the register section and instructs the allocation of pipe regions, the buffer controller may allocate the pipe regions in the packet buffer, the region size of the pipe regions being set by the page size and the number of pages.

This makes it possible to change the region sizes of the pipe regions of the packet buffer dynamically.

Another embodiment of the present invention relates to a data transfer control device for data transfer over a bus; the data transfer control device comprising:

a buffer controller which controls access to a packet buffer having a plurality of endpoint regions, data to be transferred to or from a host being stored in the endpoint regions;

a register section which includes a plurality of registers, a page size and a number of pages of each of the endpoint regions being set in corresponding one of the registers; and a transfer controller which transfers data between the host and each of the endpoint regions, a region size of each of the endpoint regions being set by the page size and the number of pages.

With this embodiment, a plurality of endpoint regions are allocated for the packet buffer. In such a case, data to be transferred (transmitted or received) to or from the host is stored (buffered) in each endpoint region. The buffer controller performs access control (region management) over the packet buffer in which these endpoint regions are allocated.

With this embodiment, a page size and a number of pages (number of planes in the buffer) for setting the region size of each endpoint region are set in registers of the register section. The transfer controller transfers data between an endpoint region, which has a region size that is set by the page size and the number of pages set in the registers, and the host. This ensures data transfer with efficient utilization of the resources of the packet buffer.

With this embodiment, the register section may comprise a plurality of transfer condition registers, transfer condition information for data transfer between the endpoint regions and the host being set in the transfer condition register, respectively, and the page size and the number of pages may be set in the transfer condition registers as the transfer condition information.

With this embodiment, transfer type of a data transfer may be set in the transfer condition registers as the transfer condition information.

This makes it possible to transfer data of each endpoint region by data transfer of an arbitrary transfer type.

With this embodiment, the transfer controller may transfer data between the endpoint regions and the host, based on the transfer condition information that has been set in the transfer condition registers.

With this embodiment, when the processing section sets the page size and the number of pages in the registers in the register section and instructs the allocation of the endpoint regions, the buffer controller may allocate the endpoint regions in the packet buffer, the region size of the endpoint regions being set by the page size and the number of pages.

With this embodiment, the page size that is set in the register may be a maximum page size.

With this embodiment, data transfer conforming to the universal serial bus (USB) on-the-go (OTG) standard may be performed.

A further embodiment of the present invention relates to electronic equipment comprising:

any of the above data transfer control devices;

a device which performs output processing, fetch processing, or storage processing on data to be transferred through the data transfer control device and bus; and a processing section which controls data transfer of the data transfer control device.

A still further embodiment of the present invention relates to a data transfer control method for data transfer through a bus, the method comprising:

allocating pipe regions in a packet buffer, data to be transferred between each of the pipe regions and corresponding one of endpoints being stored in the pipe regions;

setting a page size and a number of pages of each of the pipe regions in corresponding one register among a plurality of registers; and transferring data between each of the pipe regions and corresponding one of the endpoints, a region size of each of the pipe regions being set by the page size and the number of pages.

An even further embodiment of the present invention relates to data transfer control method for data transfer through a bus, the method comprising:

allocating endpoint regions to a packet buffer, data to be transferred between each of the endpoint regions and a host being stored in the endpoint regions;

setting a page size and a number of pages of each of the endpoint regions in corresponding one register among a plurality of registers; and transferring data between the host and each of the endpoint regions, a region size of each of the endpoint regions being set by the page size and the number of pages.

This embodiment is described below with reference to the accompanying figures.

1. OTG

The USB on-the-go (OTG) function will first be briefly described.

1.1 A-Device and B-Device

With OTG, the Mini-A plug and Mini-B plug are defined as standard connectors, as shown in FIG. 1A. Mini-AB receptacles are defined as connectors that enable connection for both of these Mini-A and Mini-B plugs (broadly speaking: first and second plugs of a cable).

Figure 1B:
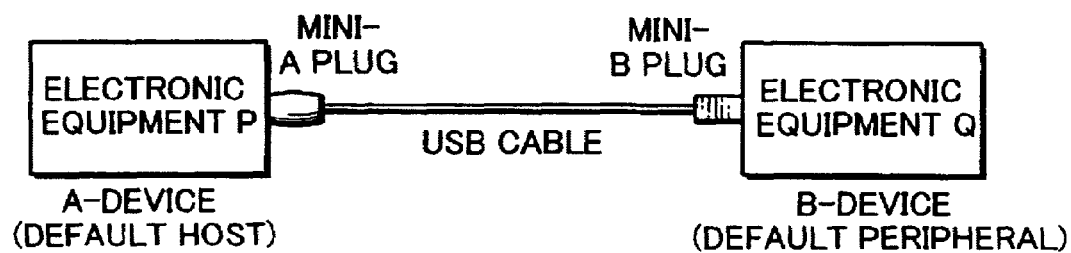
Figure 1C:
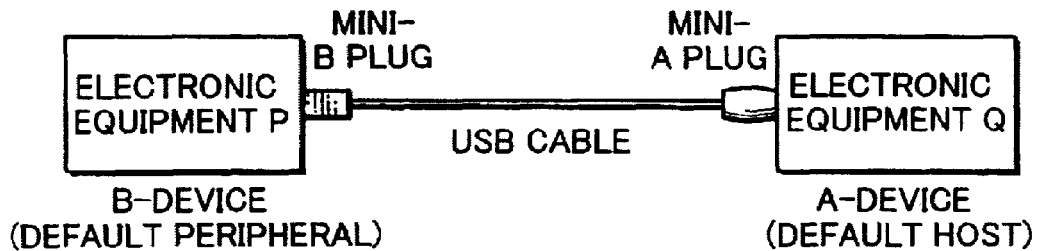

If the Mini-A plug of a USB cable is connected to electronic equipment P and the Mini-B plug is connected to electronic equipment Q, as shown in FIG. 1B by way of example, the electronic equipment P is set to be the A-device and the electronic equipment Q is set to be the B-device. If the Mini-B plug and Mini-A plug are connected to electronic equipment P and Q as shown in FIG. 1C, on the other hand, electronic equipment P and Q are set to be the B-device and the A-device, respectively.

An ID pin in the Mini-A plug is connected to ground and an ID pin in the Mini-B plug is in a floating state. Each piece of electronic equipment can determined whether a Mini-A plug or a Mini-B plug is connected to it, by using a built-in pull-up resistor circuit to detect the voltage level of that ID pin.

With OTG, the A-device (master) becomes the side (supply source) that supplies power (VBUS) and the B-device (slave) becomes the side that receives power (supply destination). The default state of the A-device is host and the default state of the B-device is peripheral.

1.2 Dual-Role Device

OTG enables the definition of a dual-role device that can perform both the role of a host (simple host) and the role of a peripheral.

A dual-role device can be either host or peripheral. The partner connected to the dual-role device determines the role of the dual-role device uniquely, depending on whether it is a host or peripheral under the prior-art USB standard. In other words, if the connected partner is a host, the dual-role device becomes a peripheral, whereas if the connected partner is a peripheral, the dual-role device becomes a host.

If the connected partner is also a dual-role device, on the other hand, the two dual-role devices can negotiate the roles of host and peripheral between themselves.

1.3 SRP and HNP

A dual-role device has session request protocol SRP and host negotiation protocol HNP functions, as shown in FIGS. 2A and 2B.

In this case, the session request protocol SRP is a protocol by which the B-device requests the supply of VBUS (power) from the A-device.

With OTG, if no bus is used, the A-device can halt the supply of VBUS. This makes it possible to prevent wasteful power consumption when the A-device is a small portable device, by way of example. If the B-device requires the supply of VBUS after the A-device has stopped the supply of VBUS, this SRP can be used to request the restart of the VBUS supply from the A-device.

The SRP flow is shown in FIG. 2A. As shown in FIG. 2A, the B-device requests the VBUS supply from the A-device by performing data line pulsing and VBUS pulsing. If the B-device operates as a peripheral after the supply of VBUS by the A-device has started, the A-device starts operating as the host.

As described with reference to FIGS. 1A to 1C, if dual-role devices are connected together, the A-device that is the side connected to the Mini-A plug becomes the default host and the B-device that is the side connected to the Mini-B plug becomes the default peripheral. With OTG, the host and peripheral roles can be switched without removing the plugs. HNP is a protocol that enables switching of the host and peripheral roles.

The HNP flow is shown in FIG. 2B. If the A-device, which is operating as host by default, stops using the bus, the bus goes into an idle state. When the B-device subsequently disables a pull-up resistor of a data signal line DP (D+), the A-device enables the pull-up resistor of DP. This changes the role of the A-device from host to peripheral, starting the operation thereof as a peripheral. The role of the B-device changes from peripheral to host, starting the operation thereof as a host.

If the B-device subsequently stops using the bus and the A-device disables its DP pull-up resistor, the B-device enables its DP pull-up resistor. This returns the role of the B-device from host to peripheral, restarting the operation thereof as peripheral. The role of the A-device returns from peripheral to host, starting the operation thereof as host.

The above-described OTG makes it possible for portable devices such as mobile phones and digital cameras to operate as USB hosts, enabling data transfer between portable devices connected in a peer-to-peer fashion. This makes it possible to add more value to the USB interface, enabling the production of applications that could not exist up before.

2. OHCI

With conventional USB, a data transfer control device (host controller) of a personal computer that acts as host conforms to a standard such as the open host controller interface (OHCI) or universal host controller interface (UHCI) proposed by Microsoft. The operating systems (OSs) that is used therefor are limited to OSs such as Windows produced by Microsoft and the Macintosh OSs produced by Apple.

However, there is an infinite variety of incorporated CPUs and architectures in the small portable devices that are target applications of OTG, as well as the OSs used therein. In addition, the versions of OHCI or UHCI that have been standardized towards the host controllers of personal computers have the prerequisite that they will be installed to function completely as USB hosts, so it is difficult to say that they can be installed in small portable devices.

Figure 3A:
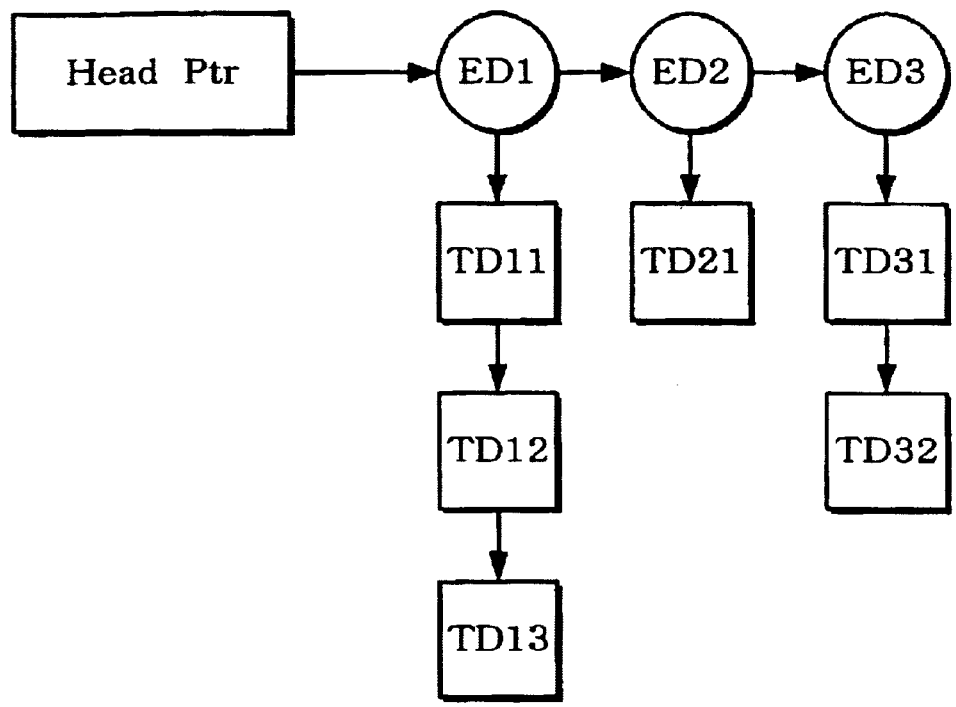
FIGS. 3A and 3B are illustrative of the OHCI list structure type descriptor.

An example of the list structure type descriptor used by OHCI is shown in FIG. 3A.

In FIG. 3A, endpoint descriptors ED1, ED2, and ED3 are linked by link pointers and include information that is necessary for communication between endpoints 1, 2, and 3. Transfer descriptors TD11 to TD13, TD21, and TD31 to TD32 are linked to ED1, ED2, and ED3 by further link pointers. Information that is necessary for packet data transferred between the endpoints 1, 2, and 3 is included within these transfer descriptors.

Figure 3B:
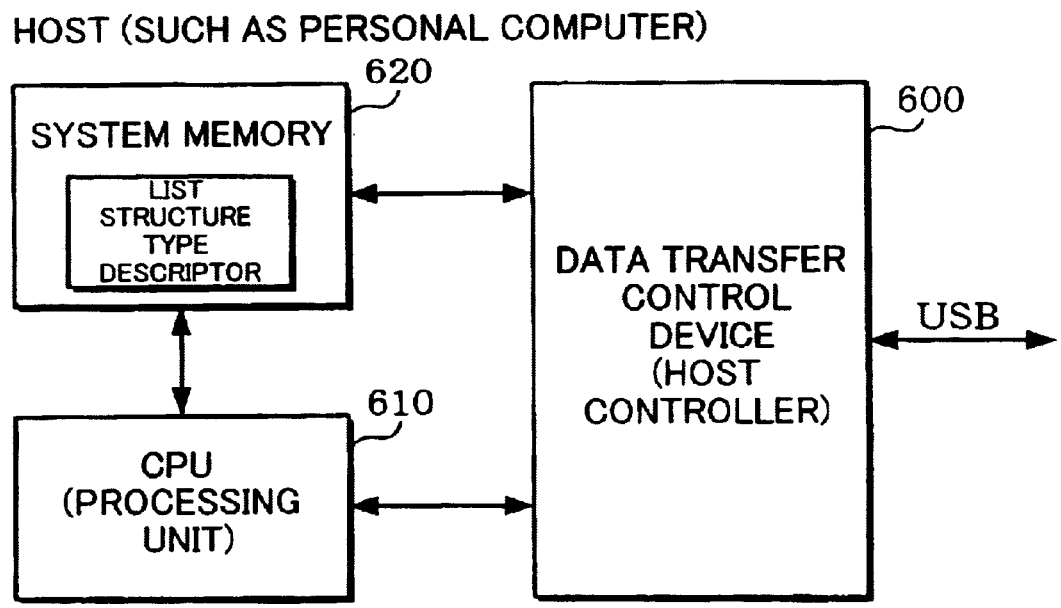

The list structure type descriptors of FIG. 3A are created by firmware (host controller/driver) operating on a CPU 610 (broadly speaking: a processing unit) shown in FIG. 3B, and are written to system memory 620. In other words, the firmware allocates endpoint descriptors to endpoints within the system, and creates endpoint descriptors and transfer descriptors based on endpoint information. These descriptors are linked by link pointers and are written to the system memory 620.

A data transfer control device 600 (host controller) reads the list structure type descriptors that were written to the system memory 620, and performs data transfer based on the information written in the endpoint descriptors and transfer descriptors.

Specifically, the data transfer control device 600 (host controller) bases the setting of information for endpoint 1 on ED1, and transfers data to and from endpoint 1 based on TD11 that is linked to ED1. Next, it bases the setting of information for endpoint 2 on ED2, and transfers data to and from endpoint 2 based on TD21 that is linked to ED2. Similarly, the data transfer control device 600 performs data transfer based on TD31, TD12, TD32, and TD13.

Figure 4:
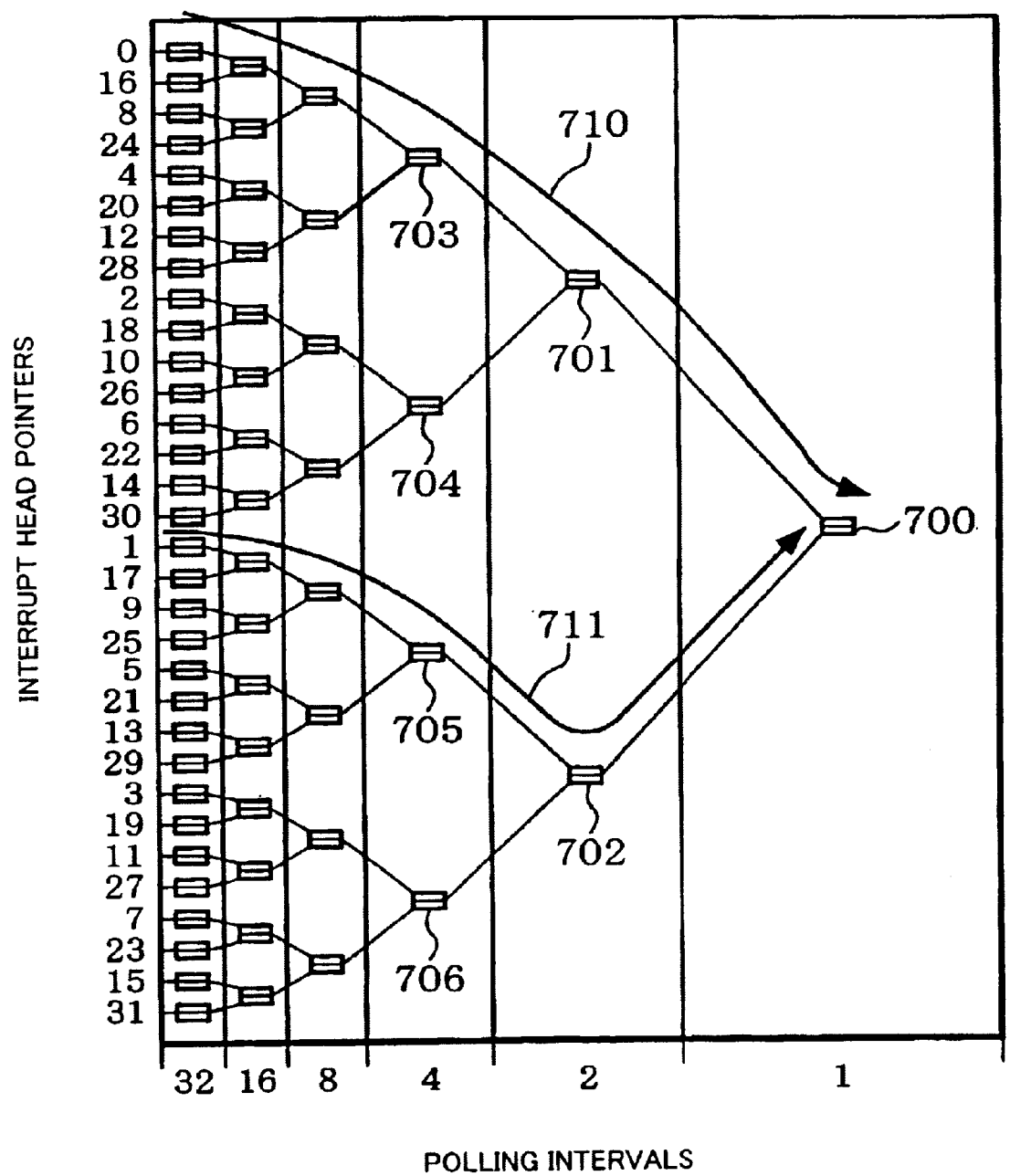
FIG. 4 is illustrative of descriptors of a binary tree configuration in accordance with OHCI.

When an interrupt transfer is done, the firmware (host controller or driver) operating on the CPU 610 creates a descriptor of a binary tree structure, as shown in FIG. 4. For an endpoint that polls for interrupt transfers every 1 ms, for example, this descriptor is set in a placeholder 700 in FIG. 4. Similarly, for an endpoint that polls for interrupt transfers every 2 ms, that descriptor is set in placeholders 701 and 702, and for an endpoint that polls every 4 ms, that descriptor is set in placeholders 703, 704, 705, and 706.

Whenever polling is done, a binary search is done in sequence from the lowest-level placeholders, in accordance with the index of interrupt head pointers. In other words, the binary search is first done for index 0 from the lowermost level, as shown by a path 710 in FIG. 4. The binary search is then done for index 1, as shown by a path 711. Similarly, the binary search continues for indices 2 to 31. This ensures that an interrupt transfer is done every 1 ms (one frame) for endpoints corresponding to the placeholder 700, every 2 ms for the endpoints corresponding to the placeholders 701 and 702, and every 4 ms for the endpoints corresponding to the placeholders 703 to 706.

In the manner described above, the firmware (host controller/driver) operating in the CPU of a data transfer control device (host controller) conforming to OHCI has to create descriptors of the complicated structure shown in FIGS. 3A and 4. The processing load on the CPU is therefore extremely high.

In such a case, the only device that can be allocated the role of host under the prior-art USB is a personal computer, and that personal computer has to have a high-performance CPU. It is therefore possible to have spare capacity therein, even during the creation of descriptors of the complicated structure shown in FIGS. 3A and 4.

However, the CPU (embedded CPU) incorporated into a small portable device (such as a digital camera or mobile phone), which is the target application for OTG, generally has a much lower level of capabilities than the CPU of a personal computer. If a portable device is to operate as an OTG host, therefore, a large load is placed on the CPU incorporated in the portable device, which impedes other processes and causes problems such as a deterioration in performance.

3. Configurational Example

Figure 5:
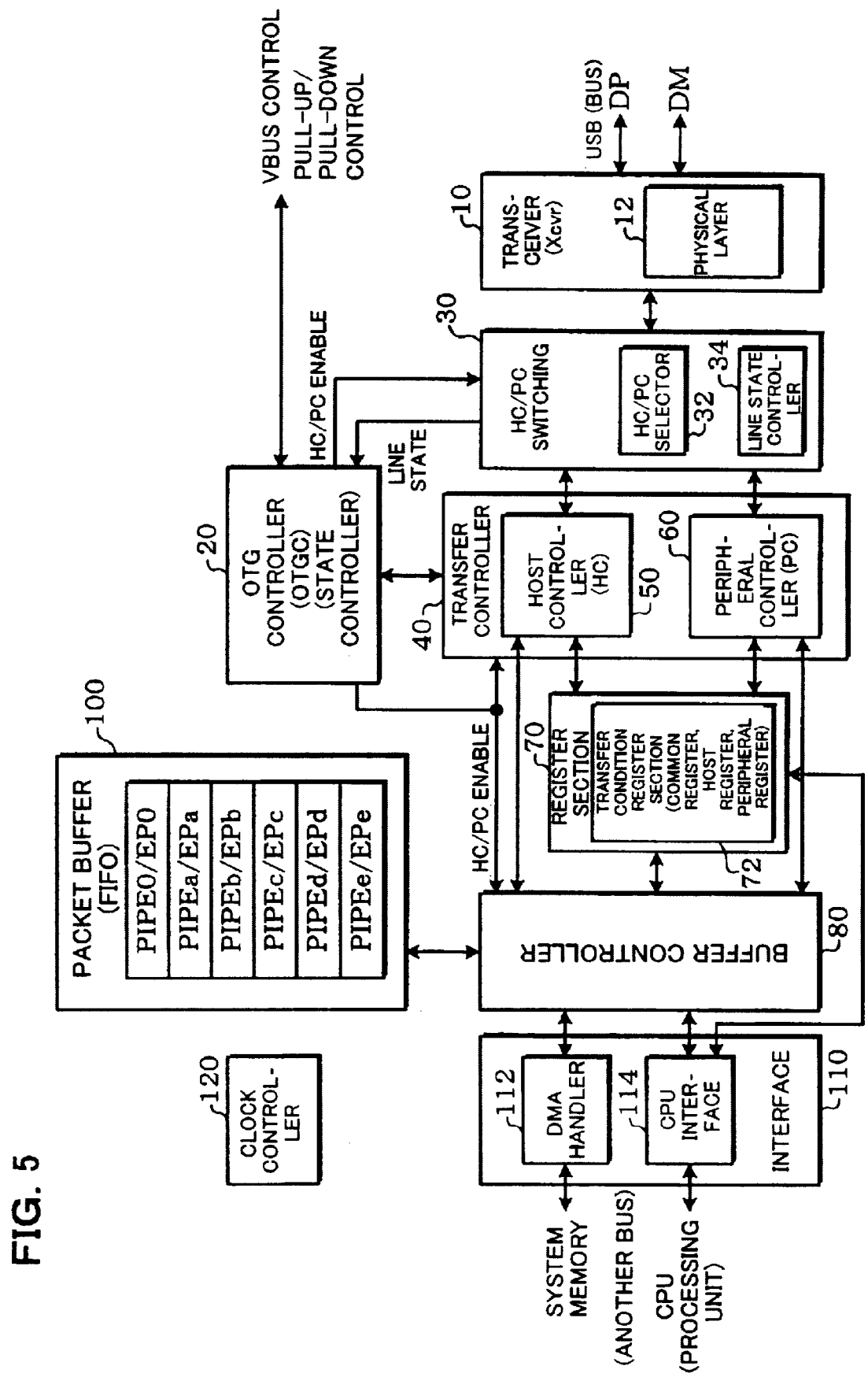
FIG. 5 shows an example of the configuration of a data transfer control device in accordance with an embodiment of the present invention.

An example of the configuration of a data transfer control device in accordance with this embodiment that can solve the above problem is shown in FIG. 5. Note that the data transfer control device of this embodiment need not necessarily have all the circuit blocks shown in FIG. 5; some of those circuit blocks can be omitted.

A transceiver 10 (hereinafter called a Xcvr as appropriate) is a circuit for transmitting and receiving USB (broadly speaking: a bus) data, using differential data signals DP and DM, and it includes a USB physical-layer (PHY) circuit 12. More specifically, the transceiver 10 creates line states (such as J, K, and SE0) for DP and DM, and performs serial-to-parallel conversion, parallel-to-serial conversion, bit stuffing, bit unstuffing, NRZI decoding, and NRZI encoding. Note that the transceiver 10 could be provided outside of the data transfer control device.

An OTG controller 20 (broadly speaking: a state controller, hereinafter called OTGC as appropriate) performs various processes for implementing OTG SRP and HNP functions (see FIGS. 2A and 2B). In other words, the OTG controller 20 controls a plurality of states including a state for host operation in which the device is operating as host and a state for peripheral operation in which the device is operating as a peripheral.

More specifically, state transitions for when the dual-role device is operating as the A-device (see FIGS. 1B and 1C) and state transitions for when it is operating as the B-device are defined within the OTG standard. The OTG controller 20 includes a state machine for implementing these state transitions. The OTG controller 20 also includes circuits that detect (monitor) the USB line state, the VBUS level, and the ID pin state. The state machine included by the OTG controller 20 causes changes in these states (states such as suspension or idle in the host or peripheral), based on the thus-detected information. The state transitions in this case could be implemented by hardware circuitry or they could be implemented by the firmware setting state commands in the registers. When the state changes, the OTG controller 20 controls VBUS and connects/disconnects the DP and DM pull-up/pull-down resistors, based on the post-transition state. A host controller 50 (hereinafter called HC as appropriate) controls the enabling/disabling of a peripheral controller 60 (hereinafter called PC as appropriate).

An HC/PC switching circuit 30 (HC/PC common circuit) performs switching control over the connections between the transceiver 10 and the host controller 50 or the peripheral controller 60. It also instructs the creation of USB data (DP and DM) line states, to the transceiver 10. Note that the connection switching control is implemented by an HC/PC selector 32 and the instructions for the creation of line states are implemented by a line state controller 34.

If the OTG controller 20 makes the HC enable signal go active during the host operation (in the host state), by way of example, the HC/PC switching circuit 30 (the HC/PC selector 32) connects the transceiver 10 and the host controller 50. If the OTG controller 20 makes the PC enable signal go active during the peripheral operation (in the peripheral state), on the other hand, the HC/PC switching circuit 30 connects the transceiver 10 and the peripheral controller 60. This makes it possible for the host controller 50 and the peripheral controller 60 to operate exclusively.

A transfer controller 40 is a circuit that controls data transfer through USB (broadly speaking: a bus), and it includes the host controller 50 (HC) and the peripheral controller 60 (PC).

In this case, the host controller 50 is a circuit that controls data transfer in the role of host during the host operation (when the HC enable signal from the OTG controller 20 is active).

In other words, the host controller 50 is connected to the transceiver 10 by the HC/PC switching circuit 30 during the host operation. The host controller 50 automatically issues transactions with respect to endpoints, based on transfer condition information that has been set in a transfer condition register section 72 of the register section 70. Automatic transfer (data transfer by hardware circuitry, without any intervention by the processing section) of data (packets) is performed to and from pipe regions (PIPE0 to PIPEe, hereinafter called PIPE as appropriate), which are allocated in a packet buffer 100, and endpoints corresponding to those pipe regions.

More specifically, the host controller 50 performs functions such as arbitration between a plurality of pipe transfers, time management in frames, transfer scheduling, and re-send management. It also manages transfer condition information (operation information) for pipe transfers, through the register section 70. It also manages transactions, creates or analyzes packets, and instructs the creation of suspend/resume/reset states.

The peripheral controller 60, on the other hand, is a circuit that controls data transfer in the role of a peripheral during the peripheral operation (when the PC enable signal from the OTG controller 20 is active).

In other words, the peripheral controller 60 is connected to the transceiver 10 by the HC/PC switching circuit 30 during the peripheral operation. It transfers data to and from endpoint regions (EP0 to EPe, hereinafter called EPs as appropriate) that have been allocated in the packet buffer 100, based on transfer condition information that has been set in the transfer condition register section 72 of the register section 70.

More specifically, the peripheral controller 60 manages transfer condition information (operation information) for endpoint transfers, through the register section 70. It also manages transactions, creates or analyzes packets, and instructs the creation of remote wake-up signals.

Note that an endpoint can have a unique address allocated thereto and is a point (portion) on the peripheral (device). All data transfer between the host and the peripheral (device) is done through these endpoints. A transaction is configured of a token packet, an optional data packet, and an optional handshake packet.

The register section 70 includes various registers for performing actions such as data transfer (pipe transfer, endpoint transfer) control, buffer access control, buffer management, interrupt control, block control, or DMA control. Note that the registers within the register section 70 could be implemented by memory such as RAM, or by D flip-flops or the like. The registers of the register section 70 need not be in a single bank, but could be disposed separately in blocks (such as HC, PC, OTGC, and Xcvr).

The register section 70 includes the transfer condition register section 72. This transfer condition register section 72 includes registers that store transfer condition information (transfer control information) for data transfer between pipe regions (PIPE0 to PIPEe) allocated in the packet buffer 100 and endpoints, during the host operation. These transfer condition registers are provided to correspond to the pipe regions of the packet buffer 100.

Note that when the device is operating as a peripheral, endpoint regions (EP0 to EPe) are allocated in the packet buffer 100. Data transfer between the data transfer control device and the host is based on the transfer condition information that has been set in the transfer condition register section 72.

A buffer controller 80 (FIFO manager) performs access (read/write) control and region management for the packet buffer 100. More specifically, it creates and manages accesses addresses for the packet buffer 100, for the CPU (broadly speaking: a processing section, direct memory access (DMA), and USB. It also arbitrates accesses to the packet buffer 100 by the CPU, DMA, and USB.

When the device is operating as host, by way of example, the buffer controller 80 sets (establishes) a data transfer path between an interface circuit 110 (CPU or DMA) and the packet buffer 100 and another data transfer path between the packet buffer 100 and the host controller 50 (USB).

When the device is operating as a peripheral, on the other hand, the buffer controller 80 sets a data transfer path between the interface circuit 110 (CPU or DMA) and the packet buffer 100 and another data transfer path between the packet buffer 100 and the peripheral controller 60 (USB).

The packet buffer 100 (FIFO, packet memory, and buffer) is intended to temporarily store (buffer) data (transmission data or reception data) that is being transferred by USB. This packet buffer 100 could be configured of random access memory (RAM), by way of example. Note that the packet buffer 100 could be provided outside of the data transfer control device (it could also be externally attached memory).

During the host operation, the packet buffer 100 is used as a first-in, first-out (FIFO) for pipe transfer. In other words, pipe regions PIPE0 to PIPEe (broadly speaking: buffer regions) are allocated in a manner to correspond to the USB (bus) endpoints. Within the pipe regions PIPE0 to PIPEe is stored data (transmission data or reception data) to be transferred with respect to the corresponding endpoints.

During the peripheral operation, on the other hand, the packet buffer 100 is used as a FIFO for endpoint transfer. In other words, endpoint regions EP0 to EPe (broadly speaking: buffer regions) are allocated in the packet buffer 100. Within the endpoint regions EP0 to EPe is stored data (transmission data or reception data) to be transferred with respect to the host.

Note that the buffer regions allocated in the packet buffer 100 (the regions set to pipe regions during the host operation or endpoint regions during the peripheral operation) are set to be regions in which the information that is input thereto first is output therefrom first (FIFO regions).

PIPE0 is a pipe region that is dedicated to endpoint 0 for control transfer, and PIPEa to PIPEe are general-purpose pipe regions that can be allocated to any endpoints.

In other words, with USB, endpoint 0 is set to be a dedicated endpoint for control transfer. It is therefore possible to prevent confusion in the user, by setting PIPE0 to be a dedicated pipe region for control transfer, as in this embodiment. It is also possible to modify the pipe region dynamically to correspond to the endpoints, by having PIPEa to PIPEe as pipe regions that can be allocated to any endpoints. This makes it possible to increase the degree of freedom of pipe transfer scheduling, thus enabling more efficient data transfer.

Note that the region size RSize of the buffer region (pipe region or endpoint region) of this embodiment is set by the maximum packet size MaxPktSize (broadly speaking; page size) and the number of pages BufferPage (RSize=MaxPktSize×BufferPage). This makes it possible to set the region size and number of pages of the buffer region as required, enabling more efficient usage of the resources of the packet buffer 100.

The interface circuit 110 is a circuit that performs data transfer between a DMA (system memory) bus or CPU bus, which are other buses that differ from USB, and the packet buffer 100. This interface circuit 110 includes a DMA handler circuit 112 for performing DMA transfers between the packet buffer 100 and external system memory. It also includes a CPU interface circuit 114 for performing parallel I/O (PIO) transfers between the packet buffer 100 and an external CPU. Note that the CPU (processing section) could also be incorporated in the data transfer control device.

A clock controller 120 generates various clocks used within the data transfer control device, based on a built-in PLL or an external input clock.

4. Pipe Regions

With this embodiment, pipe regions PIPE0 to PIPEe are allocated in the packet buffer 100 during the host operation, as shown in FIG. 6A. Data is transferred between these pipe regions PIPE0 to PIPEe and endpoints in the peripheral.

In this case, the "pipe" of the pipe region of this embodiment has a slightly different meaning from the "pipe" defined by USB (a logical abstraction expressing a linkage between an endpoint on the device and software on the host, or a logical path).

A pipe region in accordance with this embodiment is allocated in the packet buffer 100 to correspond to each endpoint possessed by a peripheral connected by USB (bus), as shown in FIG. 6A. As shown in FIG. 6A by way of example, pipe region PIPEa corresponds to endpoint 1 (bulk IN) of peripheral 1 and pipe region PIPEb corresponds to endpoint 2 (bulk OUT) of peripheral 1. Similarly, pipe region PIPEc corresponds to endpoint 1 (bulk IN) of peripheral 2 and pipe region PIPEd corresponds to endpoint 2 (bulk OUT) of peripheral 2. Furthermore, PIPEe corresponds to endpoint 1 (interrupt IN) of peripheral 3. Note that PIPE0 is a pipe region that is dedicated to endpoint 0 for control transfer.

In the example shown in FIG. 6A, USB bulk IN transfer is done between pipe region PIPEa and endpoint 1 of peripheral 1 and bulk OUT transfer is done between PIPEb and endpoint 2 of peripheral 1. Similarly, bulk IN transfer is done between PIPEc and endpoint 1 of peripheral 2 and bulk OUT transfer is done between PIPd and endpoint 2 of peripheral 2. Furthermore, interrupt IN transfer is done between PIPEe and endpoint 1 of peripheral 3.

With this embodiment as configured above, any data transfer (isochronous transfer, bulk transfer, or interrupt transfer) can be done between a pipe region (general-purpose) and the corresponding endpoint.

With this embodiment, data of a given data unit (a data unit determined by the total size) is transferred between a pipe region and the corresponding endpoint. A data unit in this case could be considered to be a data unit for a transfer requested by an I/O request packet (IRP) or such a data unit that has been divided into a unit of a suitable size, by way of example. A data transfer of such a data unit (a series of transactions) with respect to an endpoint can be called a "pipe" in accordance with this embodiment. A region in which this "pipe" of data (transmission data or reception data) is stored forms a pipe region.

Once the transfer of a given data unit through a pipe region has ended, that pipe region can be released. The released pipe region can then be allocated to any endpoint. With this embodiment as configured above, the correspondences between pipe regions and endpoints can be changed dynamically.

When the device of this embodiment is operating as a peripheral, endpoint regions EP0 to EPe are allocated (set) in the packet buffer 100, as shown in FIG. 6B. Data is then transferred between these endpoint regions EP0 to EPe and the host (host controller or system memory).

With this embodiment as configured above, the buffer region of the packet buffer 100 is allocated as pipe regions during the host operation or as endpoint regions during the peripheral operation. This makes it possible to use the packet buffer 100 resources in common during the host operation and during the peripheral operation, enabling a saving in usable storage capacity of the packet buffer 100.

Note that the number of pipe regions and endpoint regions is not limited to six and thus can be any number.

5. Setting of Region Size by Maximum Packet Size and Number of Pages

There are various different usage states of the data transfer control device, depending on the user. In other words, different users will use the data transfer control device in different ways, depending on transfer objective, transfer type, number of simultaneous transfers, CPU capability, presence/absence of DMA transfer usage, and USB processing. When the data transfer size or the transfer load is big, it is preferable that the region size of the buffer region (hereinafter, pipe region or endpoint region is abbreviated to buffer region as appropriate) of the packet buffer is as large as possible. Conversely, when the data transfer size or the transfer load is small, the region size of the buffer region need not be that big.

Figure 7A:
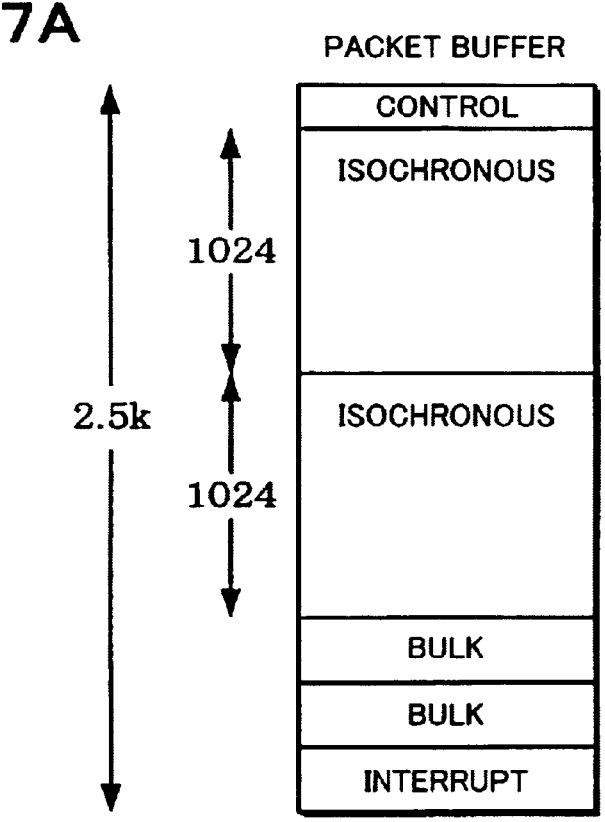
FIGS. 7A and 7B are illustrative of a problem concerning buffer region allocation.

In FIG. 7A, isochronous data is being buffered by the packet buffer, by way of example. In this case, the maximum packet size for isochronous data can be set to 1024 bytes under USB. If the isochronous data is buffered by a double-buffer method, therefore, it is necessary to allocate a buffer region of 1024×2=2048 bytes in the packet buffer. For that reason, it is preferable that the size of the packet buffer is at least 2048 bytes for a user who uses isochronous transfer, so about 2.5 kilobytes is preferable, allowing a margin.

Figure 7B:
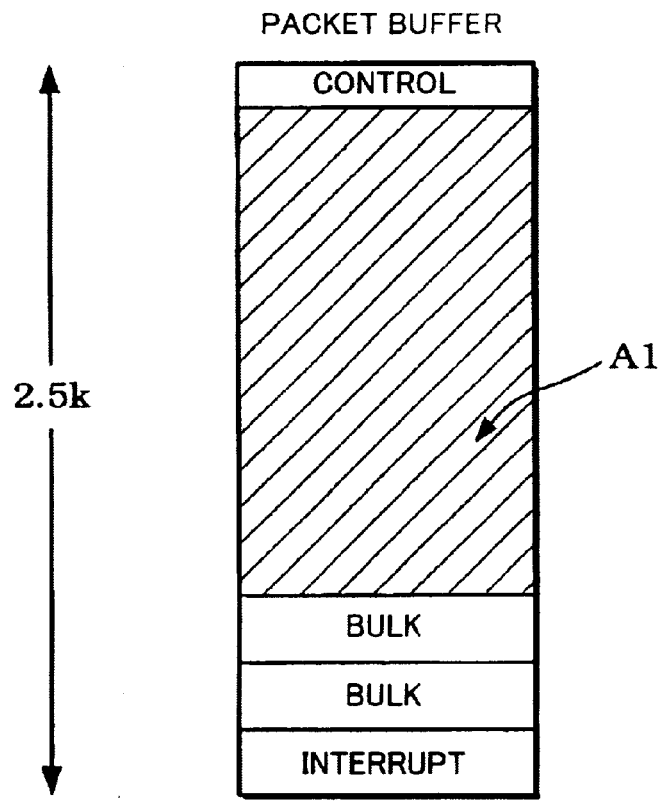

However, if the size (capacity) of the packet buffer is set as shown in FIG. 7A to enable the handling of isochronous transfer, there will be a region that is wasted when isochronous transfer is not being used, as shown in FIG. 7B. In other words, a method that allocates a buffer region of a fixed size to each transfer type, such as for control, isochronous, bulk, and interrupt, will result in the creation of a wasteful unused region, such as that shown at A1 in FIG. 7B. This causes a technical problem in that it becomes impossible to utilize the packet buffer resources efficiently.

This embodiment of the invention employs a method that enables arbitrary setting of the region size of the buffer region (pipe region or endpoint region) and the number of planes (number of pages).

Figure 8:
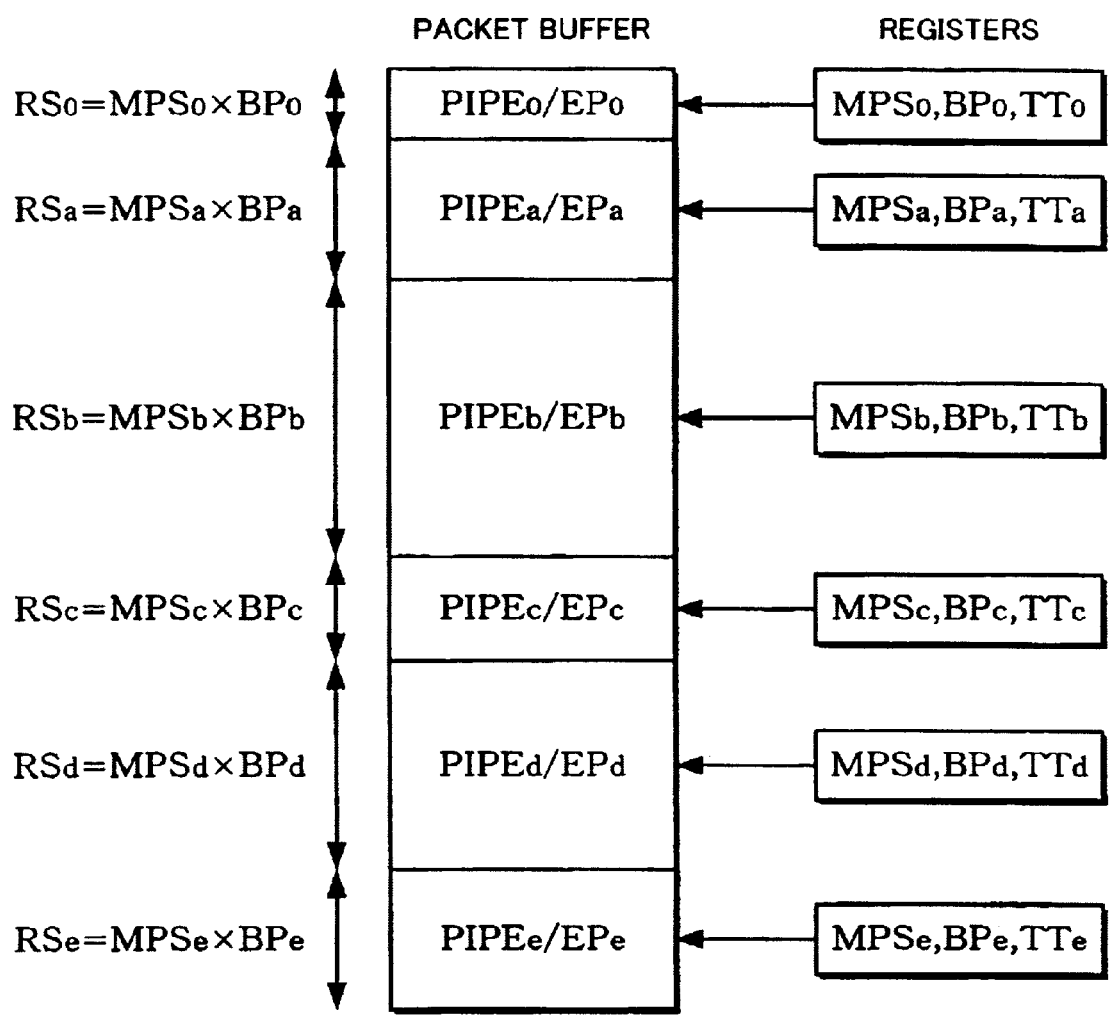
FIG. 8 is illustrative of the region allocation method of this embodiment.

More specifically, registers are provided to enable the setting of maximum packet sizes MPS0 to MPSe (MaxPkt-Size0 to MaxPktSizee, broadly speaking: page size) and numbers of pages BP0 to BPe (BufferPage0 to BufferPagee) for each buffer region PIPE0/EP0 to PIPEe/EPe in the packet buffer 100, as shown in FIG. 8. The setting of these values MPS0 to MPSe and BP0 to BPe in the registers is done by the firmware (processing section), by way of example. Buffer regions PIPE0/EP0 to PIPEe/EPe of region sizes RS0 to RSe (RSize0 to RSizee) that are set by these values MPS0 to MPSe and BP0 to BPe are allocated in the packet buffer 100. This region allocation is done by the buffer controller 80 (region allocation circuit), by way of example. The transfer controller 40 (the host controller 50 or the peripheral controller 60) uses the buffer regions PIPE0/EP0 to PIPEe/EPe of the thus-set region sizes RS0(=MPS0×BP0) to RSe (=MPSe×BPe) to transfer the packet data.

Note that transfer types TT0 to TTe (TranType0 to Tran-Typee) for the buffer regions PIPE0/EP0 to PIPEe/EPe can also be set in the registers, in addition to MPS0 to MPSe and BP0 to BPe, as shown in FIG. 8. This ensures that transfer types can be set arbitrarily for each buffer region, without fixing the transfer type (isochronous, bulk, interrupt, or control) for the buffer regions PIPE/EP0 PIPE0/EP0 to PIPEe/EPe. This also makes it possible to change the allocation of transfer type to each buffer region dynamically.

Assume by way of example that MPSa of the buffer region PIPEa/EPa is set to 1024 bytes, which is the maximum value of the maximum packet size for isochronous transfer, and BPa is set to 2. This makes it possible to allocate a buffer region PIPEa/EPa of a region size that has been set by RSa=1024×2 to 2048 bytes, enabling isochronous transfer by the double buffer method using PIPEa/EPa.

Note that setting the buffer region PIPEa/EPa to a triple buffer or higher method enables the setting of a smaller maximum packet size MPSa and also a larger number of pages BPa, such as three pages or more.

Figure 9A:
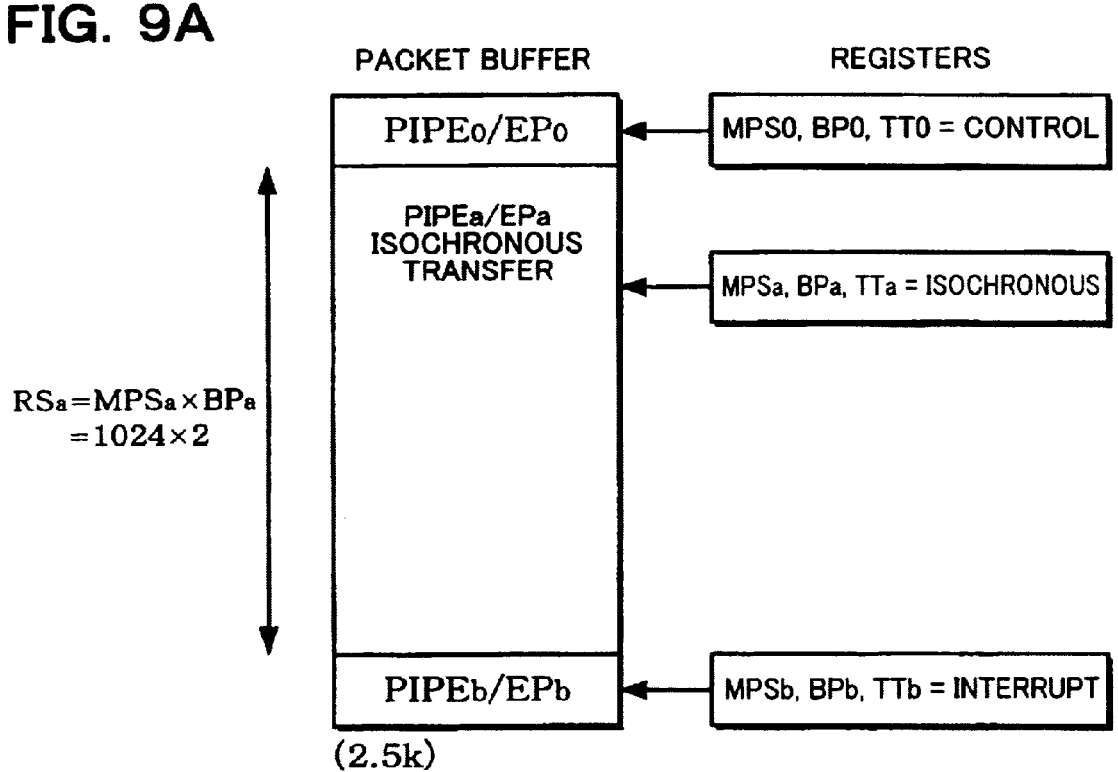
FIGS. 9A and 9B are further illustrative of the region allocation method of this embodiment.
Figure 9B:
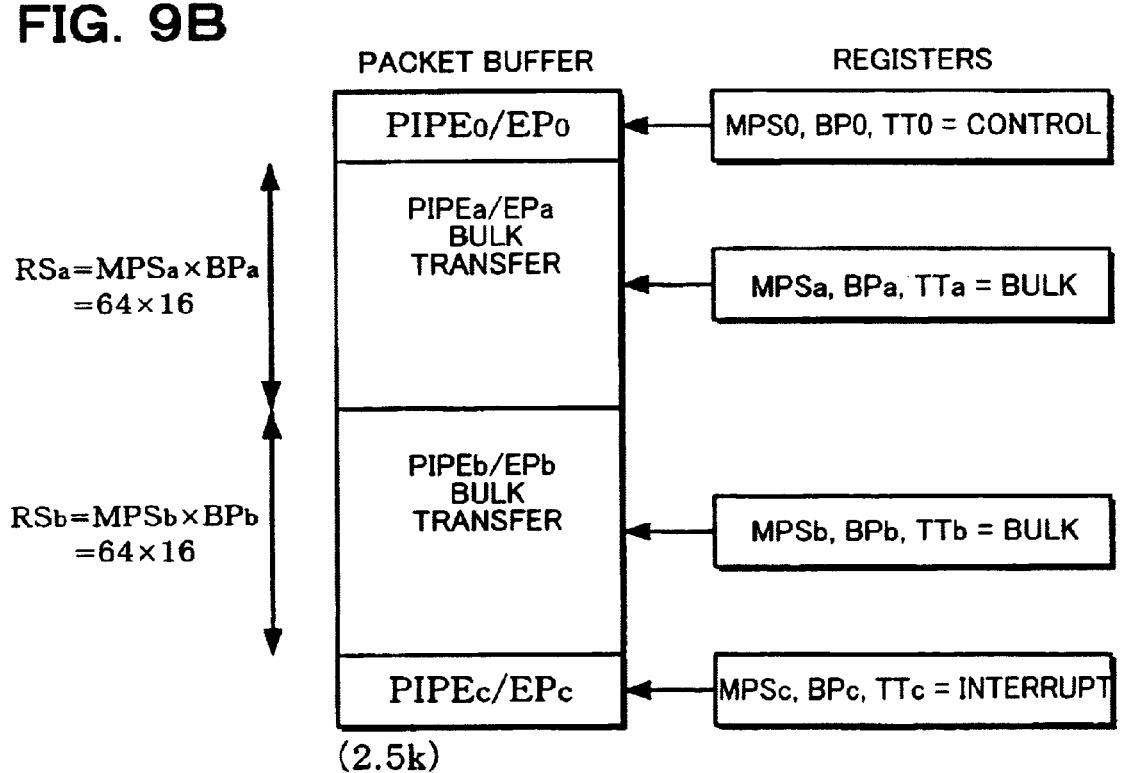
Figure 11:
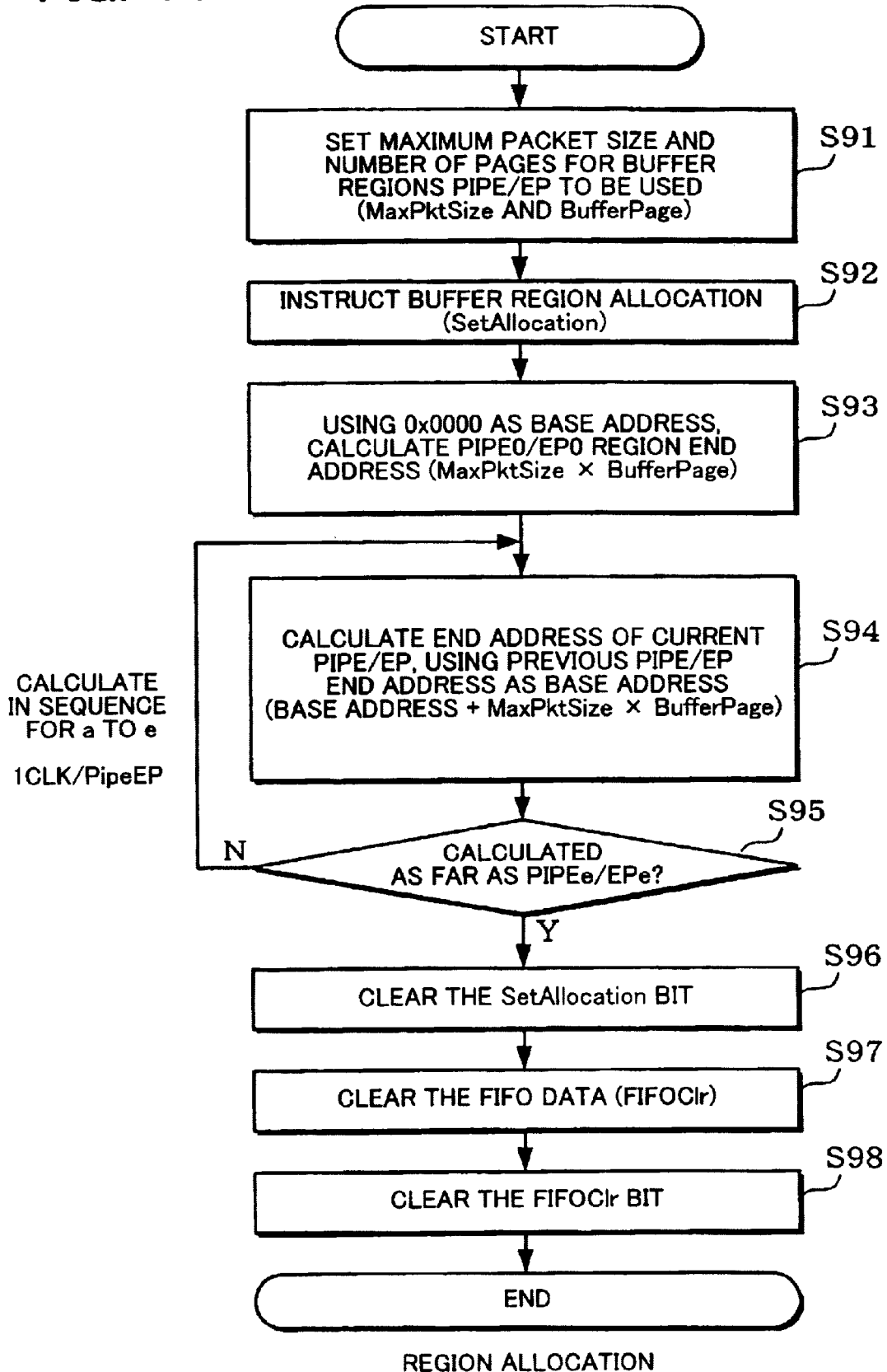
FIG. 11 is a flowchart of a specific example of region allocation processing.

Similarly, assume that MPSa and MPSb of the buffer regions PIPEa/EPa and PIPEb/EPb are set to 64 bytes, which is the maximum value of the maximum packet size for bulk transfer, and the numbers of pages BPa and BPb are set to 16, as shown in FIG. 9B. This makes it possible to allocate buffer regions PIPEa/EPa and PIPEb/EPb of a region size set by RSa=RSb=64×16 to 1024 bytes, enabling bulk transfer.

In other words, it is not possible under USB to make the maximum packet size for bulk transfer bigger than 64 bytes. Therefore, if a method of allocating a dedicated buffer region for each transfer type is employed, as shown in FIGS. 7A and 7B, the wasteful unused region shown at A1 in FIG. 7B is created when isochronous transfer is not used.

In contrast thereto, this embodiment makes it possible to prevent the creation of a wasteful unused region, by setting the number of pages (number of planes) of the buffer region for bulk transfer to a large value when isochronous transfer is not being used, as shown in FIG. 9B. This ensures efficient utilization of the resources of the packet buffer 100 and also reduces the processing load on the firmware and increases the data transfer efficiency.

Note that it is possible to have simultaneous bulk IN transfer and bulk OUT transfer, if the transfer direction for PIPEa/EPa in FIG. 9B is set to IN and the transfer direction for PIPEb/EPb is set to OUT. These transfer directions are also preferably set in registers provided for the buffer regions, in a similar manner to the maximum packet size, number of pages, and transfer type.

With this embodiment, the maximum packet sizes MPS0 to MPSe and the numbers of pages BP0 to BPe are set in common registers that are used during both host operation and peripheral operation, as shown in FIG. 10.

More specifically, pipe regions PIPE0 to PIPEe are allocated in the packet buffer 100 during the host operation, as shown in FIG. 6A. The region sizes of these pipe regions PIPE0 to PIPEe are set by the maximum packet sizes MPS0 to MPSe and the numbers of pages BP0 to BPe of the common registers.

During the peripheral operation, on the other hand, endpoint regions EP0 to EPe are allocated in the packet buffer 100, as shown in FIG. 6B. The region sizes of these endpoint regions EP0 to EPe are set by the maximum packet sizes MPS0 to MPSe and the numbers of pages BP0 to BPe of the common registers.

This configuration makes it possible to reduce the size of the circuitry of the register section 70 in comparison with a method in which separate host operation registers and peripheral operation registers are provided, enabling a saving on the resources of the register section 70. Since the firmware (processing section) manages common addresses by the same addresses, the address management of the firmware can be simplified and the processing load on the firmware can be reduced.

Note that it is preferable to set the transfer type (isochronous, bulk, interrupt, or control) and transfer direction (IN or OUT) in the common registers of FIG. 10, in addition to the maximum packet size and the number of pages. This makes it possible to further reduce the size of the register section 70 and also further reduce the processing load on the firmware.

With this embodiment as described above, a buffer region of the maximum packet size can be allocated by any number of planes (such as double buffer or triple buffer), for each endpoint. In other words, the firmware simply sets the maximum packet size MPS (page size) and the number of pages BP (number of planes in the buffer) in the registers, to cause the allocation of a buffer size of the size set by the product of MPS and BP.

By setting the region size and number of pages (number of planes) of each buffer region as required in this manner, it is possible to allocate a buffer region of a large size for one endpoint when there is a small number of endpoints, or, conversely, allocate a region that divides up one resource (the packet buffer) when there is a large number of endpoints. If there are high-load endpoints that require a high transfer efficiency and low-load endpoints that don't require a high transfer efficiency, it is possible to allocate spare region to the high-load endpoints by reducing the buffer region for the low-load endpoints. This embodiment thus makes it possible to allocate the packet buffer resources efficiently in accordance with circumstances, thus providing more freedom in task processing and operating times of the CPU.

6. Region Allocation Processing

The description now turns to a specific example of region allocation, with reference to the flowchart shown in FIG. 1.

First of all, the firmware sets the maximum packet size (MaxPktSize) and the corresponding number of pages (BufferPage) for each buffer region PIPE/EP to be used (step S91). The firmware (processing section) then instructs buffer region allocation (SetAllocation) (step S92). Note that a example of MaxPktSize and BufferPage setting by the firmware is shown in FIG. 12A and an example of the regions allocated by this setting is shown in FIG. 12B.

The buffer controller 80 (region allocation circuit) then adds MaxPktSize×BufferPage of PIPE0/EP0 of the buffer region to the base address (0x0000), to obtain the end address of PIPE0/EP0 (step S93).

Figures 12A, 12B:
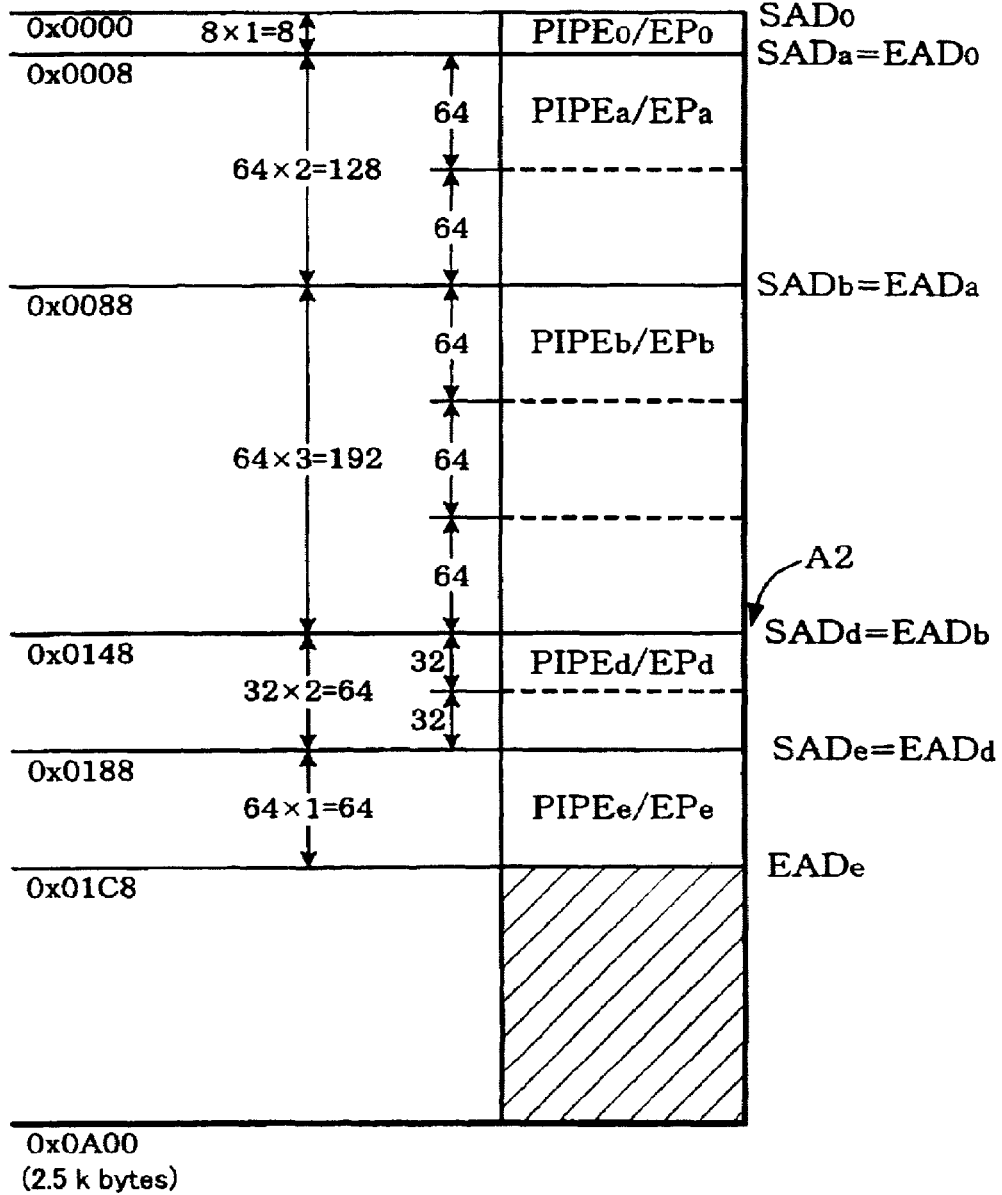
FIG. 12A shows an example of the setting of the maximum packet size and number of pages and FIG. 12B shows an example of regions that are allocated by this setting.

In the example shown in FIG. 12B, adding MaxPktSize×BufferPage to 0x0000 gives an end address EAD0 of 0x0008 for PIPE0/EP0. This end address EAD0 becomes the start address SADa for the next PIPE0/EP0.

Using the previous end address of the pipe region PIPE/EP as the base address, the end address of the current PIPE/EP is calculated by adding MaxPktSize×BufferPage thereto (step S94). The processing of step S94 is done for each of PIPEa/EPa to PIPEe/EPe in sequence (step S95). The SetAllocation bit is cleared, the FIFO data is cleared (FIFOClr), and the FIFOClr bit is cleared (steps S96, S97, and S98).

In this manner, buffer regions can be allocated in the packet buffer 100 as shown in FIG. 12B. Note that one of the maximum packet size and the number of pages of the buffer region PIPEc/EPc is set to zero at A2 of FIG. 12B, in which case PIPEc/EPc is not allocated.

7. Transfer Condition Registers (Common Registers)

Figure 13:
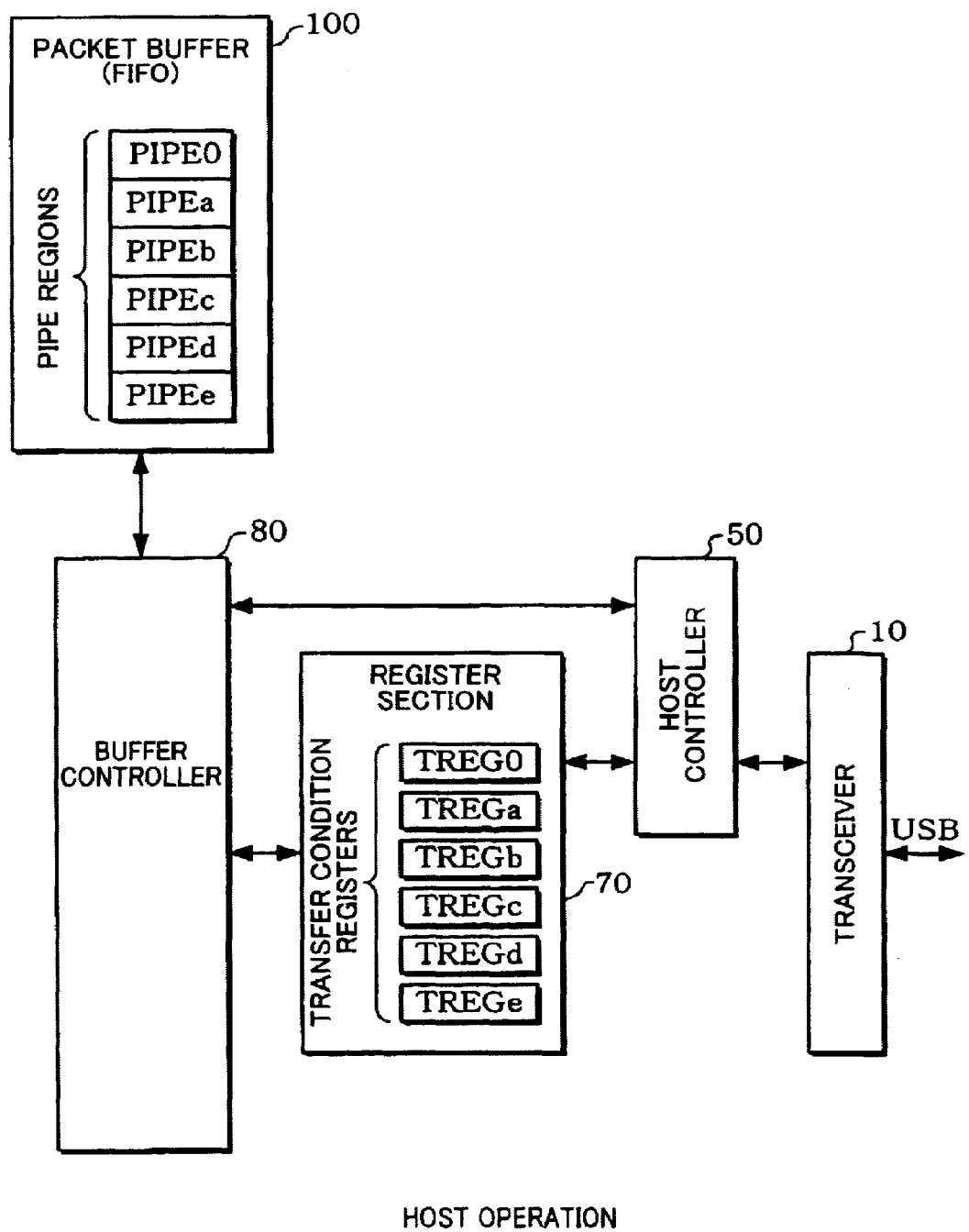
FIG. 13 is illustrative of the operation of the data transfer control device as a host.

When the device of this embodiment is operating as a host, transfer condition information (such as transfer direction, transfer type, maximum packet size, or number of pages) for data transfer to be performed between pipe regions PIPE0 to PIPEe and endpoints is set in transfer condition registers TREG0 to TREGe, as shown in FIG. 13. In other words, transfer condition information for PIPE0, PIPEa, PIPEb, PIPEc, PIPEd, and PIPEe is set (stored) in TREG0, TREGa, TREGb, TREGc, TREGd, and TREGe. This setting could be done by firmware (the CPU), by way of example.

The host controller 50 (broadly speaking: a transfer controller) issues each transaction with respect to an endpoint, based on the transfer condition information that has been set in the transfer condition registers TREG0 to TREGe. Data (packets) is transferred automatically between each pipe region and the corresponding endpoint.

With the thus-configured embodiment, a transfer condition register is provided for each pipe region (buffer region) and pipe transfer for each pipe region (transfer of a given data unit) is done automatically by the host controller 50, based on the transfer condition information that has been set in these transfer condition registers. The firmware (driver or software) therefore need not be involved in data transfer control after setting the transfer condition information in the transfer condition registers, until data transfer is complete. An interrupt is generated when the pipe transfer of the given data unit is complete, to inform the firmware than the transfer is complete. This enables a large reduction in the processing load on the firmware (CPU).

Figure 14:
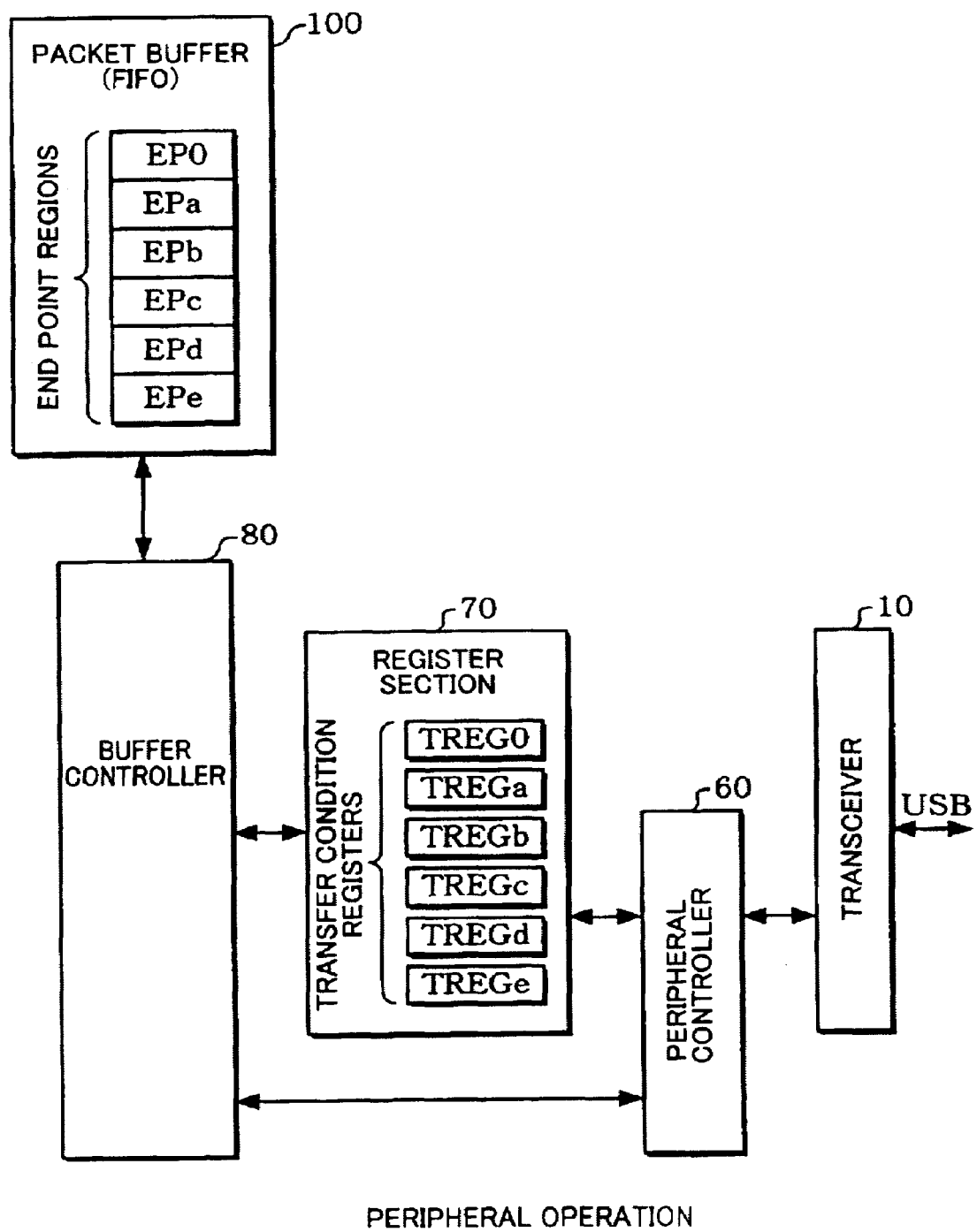
FIG. 14 is illustrative of the operation of the data transfer control device as a peripheral.

Note that when the device of this embodiment is operating as a peripheral, transfer condition information (such as transfer direction, transfer type, maximum packet size, or number of pages) for data transfer to be performed between the endpoint regions EP0 to EPe and the host is set in the transfer condition registers TREG0 to TREGe, as shown in FIG. 14. The peripheral controller 60 (broadly speaking: a transfer controller) performs data transfer between the endpoint region and the host, based on the transfer condition information that has been set in the transfer condition registers TREG0 to TREGe.

With the thus-configured embodiment, the transfer condition registers TREG0 to TREGe are used in common during operation as host and during operation as peripheral. This makes it possible to save on resources for the register section 70, thus making the data transfer control device smaller.

An example of the configuration of the registers of the register section 70 is shown in FIG. 15. Note that some of the registers of the register section 70 could be included within individual blocks (such as OTGC, HC, PC, or Xcvr).

As shown in FIG. 15, the transfer condition registers (TREG0 to TREGe) of the register section 70 include HC/PC common registers (common transfer condition registers) used both during the host operation (HC, PIPE) and during the peripheral operation (PC, EP). It also includes HC (PIPE) registers (transfer condition registers for the host) that are used only during the host operation. It further includes PC (EP) registers (transfer condition registers for the peripheral) that are used only during the peripheral operation. In addition, it includes access control registers which are registers for controlling access to the packet buffer (FIFO) and which are used both during the host operation and during the peripheral operation.

While a dual-role device is operating as a host, for example, the host controller 50 (HC) transfers data (packets), based on transfer condition information set in the HC/PC common registers and the HC registers.

During operation as a peripheral, on the other hand, the peripheral controller 60 (PC) transfers data (packets), based on transfer condition information set in the HC/PC common registers and the PC registers.

During both host operation and peripheral operation, the buffer controller 80 performs access control (such as initiation of read/write addresses, data read/write, access arbitration) to the packet buffer 100, based on the common access control registers.

The data transfer direction (such as IN, OUT, or SETUP), the transfer type (transaction type, such as isochronous, bulk, interrupt, or control), endpoint number (the number linked to an endpoint in a USB device), and the maximum packet size (maximum payload size of a packet that an endpoint can transmit or receive, the page size) are set in the HC/PC common registers of FIG. 15. In addition, the number of pages in the buffer region (pipe region or endpoint region) (number of planes in the buffer region) is set therein. Furthermore, information that instructs the presence or absence of a DMA connection (presence or absence of the use of DMA transfer by the DMA handler circuit 112 of FIG. 5) is set therein.

The token issue period for interrupt transfer (the period or interval at which interrupt transactions are activated) is set in the HC (PIPE) registers. The number of continuous executions of transactions (information that sets transfer ratios between the pipe regions, the number of continuous executions of transactions for each pipe region) is also set. The function address (USB address of a function having an endpoint) and the total size of the transfer data (total size of data to be transferred through each pipe region, in data units such as IRP) are also set. The automatic transaction start instruction (a start instruction for automatic transaction with respect to the host controller) is also set. The automatic control transfer mode instruction (an instruction for a mode that automatically initiates the control transfer setup stage, data stage, and status stage) is set.

The endpoint enable (an instruction that enables or disables an endpoint) and a handshake specification (a specification of the handshake to be used for each transaction) are set in the PC (EP) registers.

The buffer and I/O port (the I/O port for PIO transfer by the CPU) is set in the common access control registers for packet buffer (FIFO). A buffer full/empty flag (notification of whether each buffer region is full or empty) and a buffer remaining data size (the remaining data size for each buffer region) are also set.

The register section 70 includes registers such as interrupt-related registers, block-related registers, and a DMA control register.

The interrupt-related registers include an interrupt status register that indicates the interrupt status (cause) to the CPU, and an interrupt enable register that sets enabled/disabled (non-masked, masked) for interrupts. Note that the interrupts include interrupts relating to the OTG controller 20, to the host controller 50, and to the peripheral controller 60.

The block-related registers include an inter-block common register that is used in common between blocks and block registers that are used within the blocks (Xcvr, OTGC, HC, and PC).

The inter-block common register is a register that instructs the reset of each block. The block registers include a register for controlling the transceiver 10 (Xcvr), a state command register for the OTG controller 20 (OTGC), a state command register for the host controller 50 (HC), and a register for setting frame number.

With this embodiment as described above, registers used both during the host operation and during the peripheral operation (HC/PC common registers and common access control registers) are provided in the register section 70. This enables a reduction in size of the register section 70, in comparison with the case in which completely separate registers are provided for when the device is operating as a host and when it is operating as a peripheral. Access addresses to the common registers, as seen from the firmware (driver) operating on the CPU, can be made the same for host operation and peripheral operation. The firmware can therefore use the same addresses for managing these common registers, enabling a simplification of the firmware processing.

Since HC registers and PC registers are provided, specific transfer conditions can be set for host operation (PIPE) transfer and peripheral operation (EP) transfer. For example, it is possible to issue the interrupt transfer token at any desired timing during the host operation, by setting the token issue period. It is also possible to set the transfer ratios between pipe regions as required during the host operation, by setting the numbers of continuous executions. Similarly, it is possible to set any data size to be transferred automatically through a pipe region during the host operation, by setting the total size therefor. The firmware is configured in such a manner that it can instruct the start of automatic transactions and instruct the turning on and off of automatic control transfer mode, during the host operation.

8. Automatic Transactions

Figure 16:
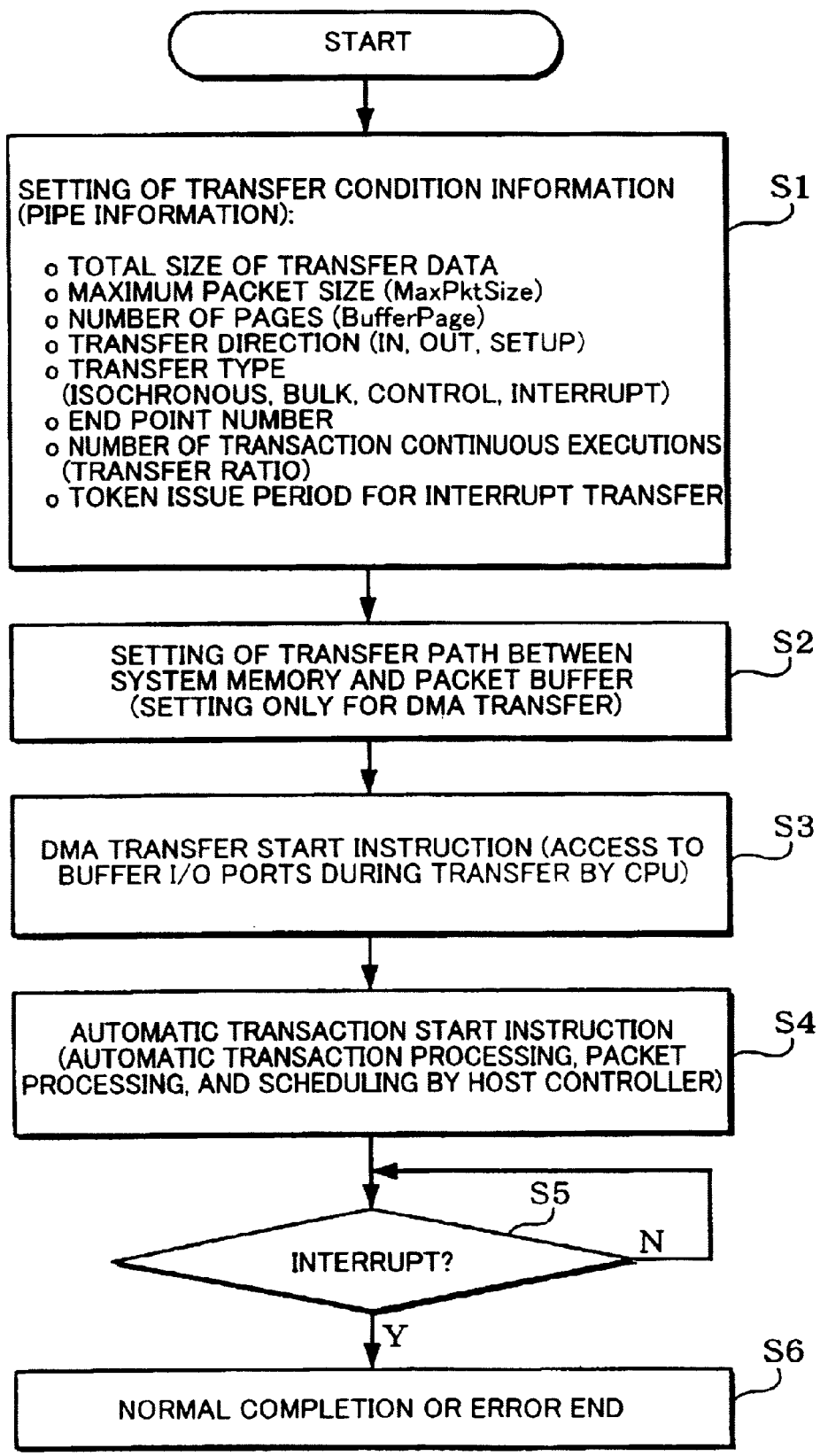
FIG. 16 is a flowchart illustrating a processing example of the firmware.

A typical flowchart of firmware processing during the processing of automatic transaction (IN or OUT) of the host controller 50 is shown in FIG. 16.

First of all, the firmware (processing section or driver) sets the transfer condition information (pipe information) in the transfer condition registers described with reference to FIG. 15 (step S1). More specifically, data such as the total size of the transfer data, the maximum packet size (MaxPktSize), the number of pages (BufferPage), the transfer direction (IN, OUT, or SETUP), the transfer type (isochronous, bulk, control, or interrupt), the endpoint number, the number of continuous transaction executions for the pipe region (transfer ratio), and the token issue period for interrupt transfer are set in the transfer condition registers.

The system then sets a transfer path between the external system memory and the packet buffer 100 (step S2). In other words, it sets a DMA transfer path through the DMA handler circuit 112 of FIG. 5.

The firmware then instructs DMA transfer start (step S3). In other words, it makes the DMA transfer start instruction bit of the DMA control register of FIG. 15 go active. Note that transfer by CPU enables access to the packet buffer 100 by access to the buffer I/O ports of FIG. 15.

The firmware then instructs the automatic transaction start (step S4). In other words, it makes the automatic transaction start instruction bit of the HC register (pipe register) of FIG. 15 go active. This causes the host controller 50 to perform automatic transaction processing, packet processing (packet creation/analysis), and scheduling processing. In other words, the host controller 50 automatically transfers data specified by the total size, using packets of a payload of the maximum packet size and in the direction (IN or OUT) specified by the transfer direction.

Note that the processes of steps S3 and S4 can be done in either order, so that the DMA transfer start instruction can come after the automatic transaction start instruction.

The firmware waits until the issue of an interrupt informing of the completion of the pipe transfer (step S5). When the interrupt is issued, the firmware checks the interrupt status (cause) in the interrupt-related register of FIG. 15. The processing is either completed normally or ends in error (step S6).

Simply by setting transfer condition information for each pipe region (step S1) then instructing DMA transfer start (step S3) and automatic transaction start (step S4), the firmware of the thus-configured embodiment can rely on the hardware circuitry of the host controller 50 to perform subsequent data transfer processing automatically. This therefore reduces the processing load on the firmware in comparison with the method that conforms to OHCI, described with reference to FIGS. 3A, 3B, and 4, making it possible to provide a data transfer control device that is optimal for a portable device that incorporates a limited-capability CPU.

Figure 17:
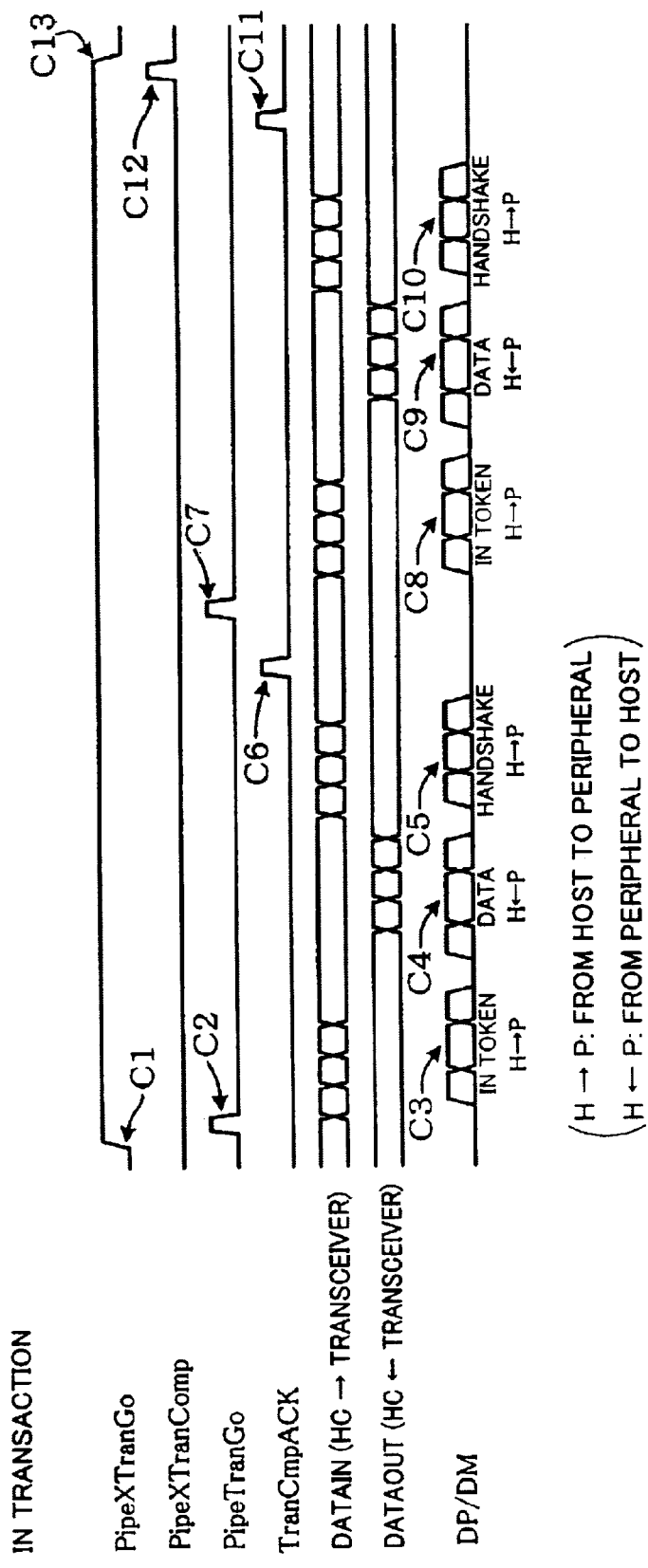
FIG. 17 shows examples of signal waveforms during the automatic transaction processing for an IN transaction.
Figure 18:
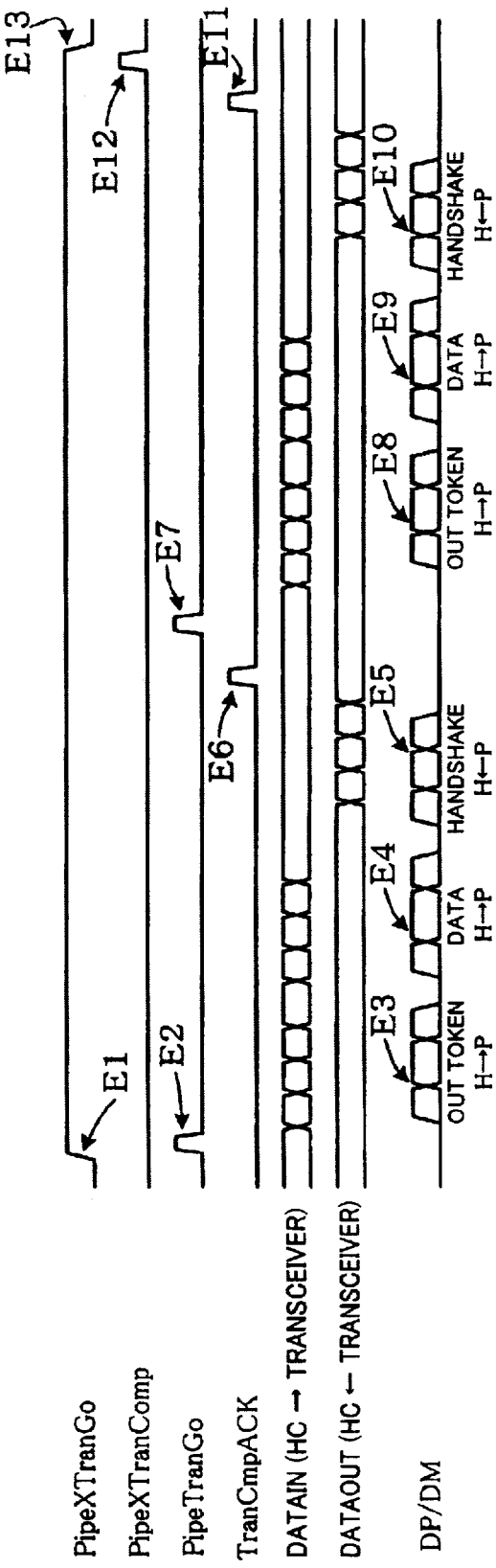
FIG. 18 shows examples of signal waveforms during the automatic transaction processing for an OUT transaction.

Examples of the signal waveforms during automatic transaction processing by the host controller 50 are shown in FIGS. 17 and 18. Note that "H→P" in these figures represents "transfer from host to peripheral" and "P→H" represents "transfer from peripheral to host".

FIG. 17 shows examples of signal waveforms for an IN transaction (when the transfer type is IN).

In step S4 of FIG. 16, the firmware instructed the start of automatic transaction, whereupon PipeXTranGo (the transfer request signal from the firmware for PipeX) goes active, as shown at C1 in FIG. 17. This starts the automatic transaction processing by the host controller 50 for this PipeX (where X=0 to e).

When PipeTranGo (the transfer request signal from the HC sequence management circuit within the host controller 50) goes active at C2, the host controller 50 creates an IN token packet at C3 and transfers it to the peripheral via USB at C3. When the IN data packet is transferred from the peripheral to the host controller 50 at C4, the host controller 50 generates a handshake packet (ACK) at C5 and transfers it to the peripheral. This makes TranCmpACK go active at C6.

Similarly, when PipeTranGo goes active at C7, packet transfers occur at C8, C9, and C10, and TranCmpACK goes active at C11. PipeXTranComp (a transfer end notification signal for an IRP data unit, to the firmware) goes active at C11. This interrupt by PipeXTranComp makes it possible to inform the firmware that the transfer for that pipe has been completed.

Note that when PipeXTranComp goes active, PipeXTranGo goes inactive at C13 to indicate that that pipe is in a non-transfer state.

Examples of signal waveforms during an OUT transaction (when the transfer type is OUT) are shown in FIG. 18.

When the firmware instructs the start of the automatic transaction, PipeXTranGo goes active at E1, then PipeTranGo goes active at E2. When that happens, the host controller 50 transfers the OUT token packet to the peripheral at D3 and transfers the OUT data packet at D4. When a handshake packet (ACK) is returned from the peripheral at D5, TranCmpACK goes active at D6.

Similarly, when PipeTranGo becomes active at E7, the packet transfers shown at E8, E9, and E10 occur, and TranCmpACK becomes active at E11. PipeXTranComp then becomes active at E12. This interrupt by PipeXTranComp makes it possible to inform the firmware that the transfer for that pipe has been completed. Note that when PipeXTranComp becomes active, PipeXTranGo becomes inactive as shown at E13.

9. Detailed Configurational Examples of Blocks

The description now turns to details of the configurations of the various blocks.

9.1 OTG Controller

Figure 19:
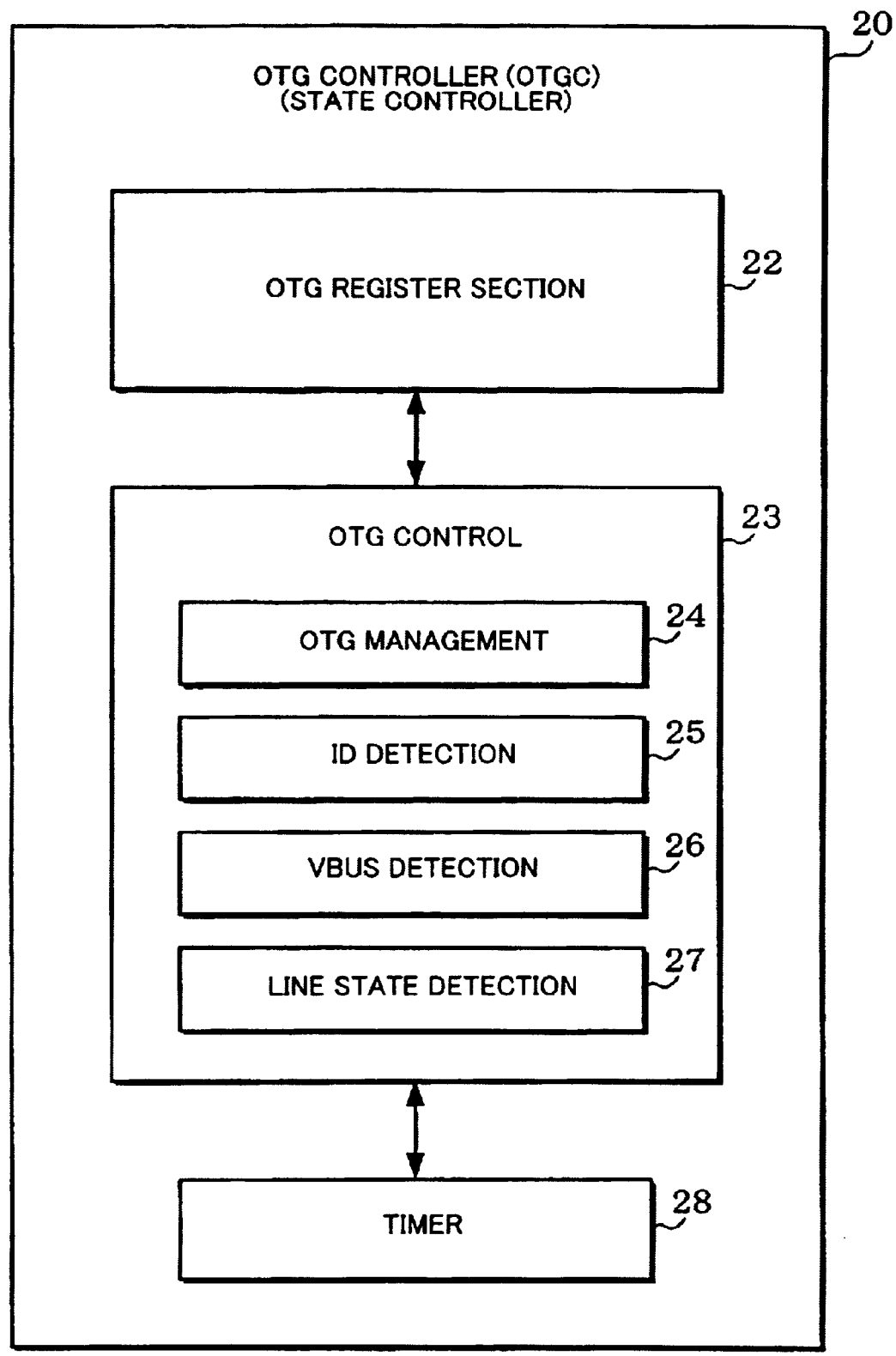
FIG. 19 shows a detailed example of the configuration of the OTG controller.

An example of the configuration of the OTG controller 20 is shown in FIG. 19.

The OTG controller 20 includes an OTG register section 22. This OTG register section 22 includes monitor and control registers for the OTG controller 20. It also includes a circuit that decodes OTG state commands that are written by the firmware (CPU).

The OTG controller 20 also includes an OTG control circuit 23. This OTG control circuit 23 includes an OTG management circuit 24 that manages the OTG state, an ID detection circuit 25 that detects the voltage level of the ID pin, a VBUS detection circuit 26 that detects the voltage level of VBUS, and a line state detection circuit 27 that detects the DP and DM line states.

The OTG controller 20 also includes a timer 28 that measures time, which is one transition determination condition for OTG states.

Information to be detected for changing the OTG state is ID, the VBUS voltage level, and the DP/DM line state. The OTG controller 20 of this embodiment detects this information and transfers it to the firmware (CPU) via monitor registers.

The firmware changes its own state, based on the thus-detected information, and also uses the OTG state command to inform the OTG controller 20 of the next state to change to.

The OTG controller 20 decodes the OTG state command then performs VBUS drive control and connection control over the pull-up/pull-down resistors, based on the decoded result, to implement the SRP or HNP described with reference to FIGS. 2A and 2B.

With this embodiment as described above, the OTG controller 20 is in charge of OTG control in each state so that the firmware can concentrate on state transition management. As a result, the processing load on the firmware (CPU) can be reduced in comparison with the case in which all state control is implemented by the firmware, and it is also possible to develop efficient firmware.

Note that the determination of OTG state transitions could be done by hardware circuitry, not the firmware. Alternatively, substantially all of the processing of the OTG controller 20 (such as processing other than VBUS control, pull-up/pull-down resistor control, ID detection, VBUS detection, and line state detection) could be implemented by firmware (software).

9.2 Host Controller and Peripheral Controller

Figure 20A:
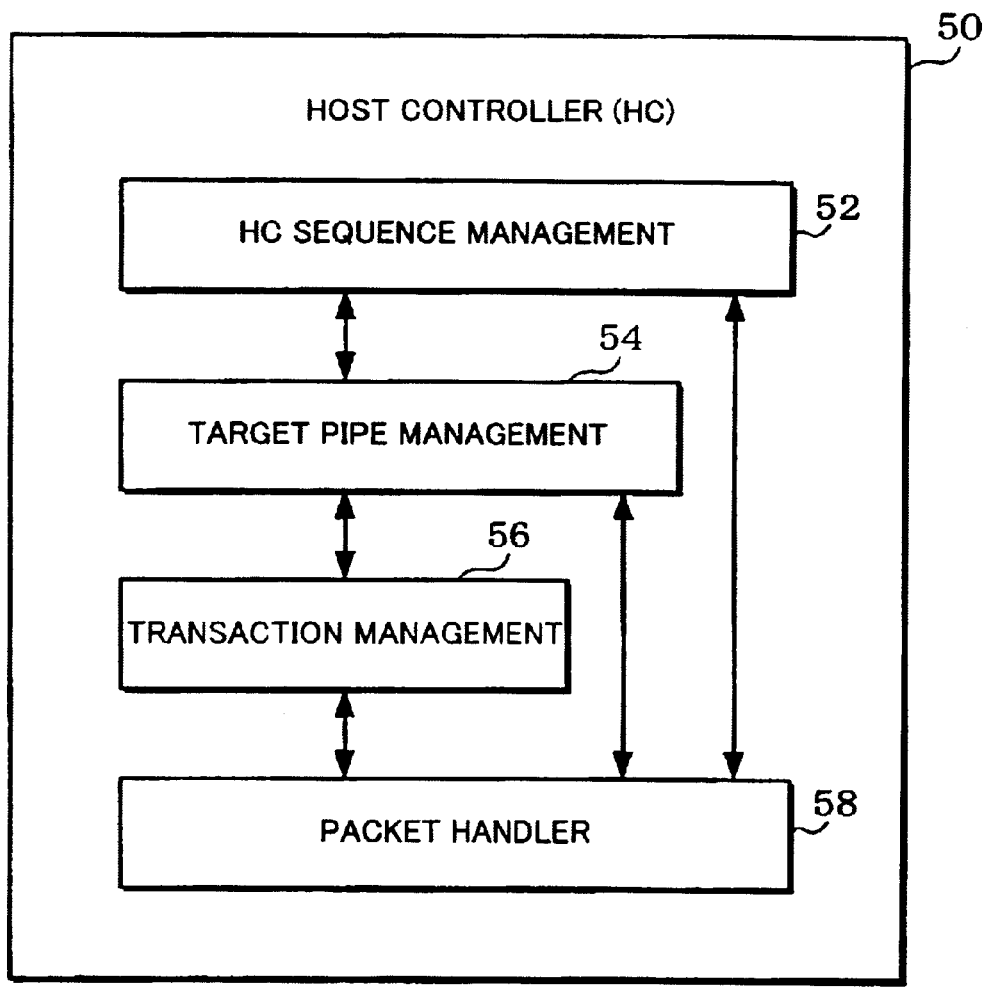
FIGS. 20A and 20B show detailed examples of the configurations of the host controller and the peripheral controller.

An example of the configuration of the host controller 50 is shown in FIG. 20A.

The host controller 50 includes an HC sequence management circuit 52. This HC sequence management circuit 52 performs functions such as arbitration of pipe transfer (data transfer using the pipe region), time management, scheduling of pipe transfer, and re-transmission management.

More specifically, the HC sequence management circuit 52 instructs the transmission of the frame number count and a start-of-frame (SOF) packet. It performs processing to ensure that isochronous transfer is executed preferentially at the start, and processing to ensure that interrupt transfers are handled preferentially after isochronous transfers. It also processes each pipe transfer instruction in accordance with the pipe transfer sequence. Furthermore, it manages the number of continuous executions of transactions and confirms the remaining frame time. In addition, it performs processing to cope with handshake packets (ACK or NAK) returning from the peripheral. It also performs error processing during transaction execution.

The host controller 50 includes a target pipe management circuit 54. This target pipe management circuit 54 performs processing such as the handling of transfer condition information that has been set in the transfer condition registers of the register section 70.

More specifically, the target pipe management circuit 54 selects transfer condition information and creates interrupt signals. After automatic transaction start has been instructed, it loads the total size of transfer data for that pipe region. It then performs count processing (decrementation) of the remaining transfer data size. It also confirms the state of the buffer (FIFO) region during the transmission/reception of data to the buffer controller 80. It also instructs a transaction management circuit 56 to perform transfers. Furthermore, it determines the reception of an unexpected short packet or the reception of a packet of larger than the maximum packet size. If a mode in which a zero-length packet is transferred automatically has been set, it instructs the transaction management circuit 56 to transmit the final zero-length packet. It also manages the sequencing for automatic control transfer mode.

The host controller 50 includes the transaction management circuit 56. This transaction management circuit 56 classifies transfer packets and manages the transfer sequence (transaction sequence management). It also monitors for time-out. Furthermore, it performs transaction end notification processing.

The host controller 50 includes a packet handler circuit 58. This packet handler circuit 58 creates or analyzes packets. It also performs PID checks and decodes/encodes CRC bits. It reads or writes the payloads of packets in the buffer region, and transmits SOF packets. It also counts the transmission/reception data.

Figure 20B:
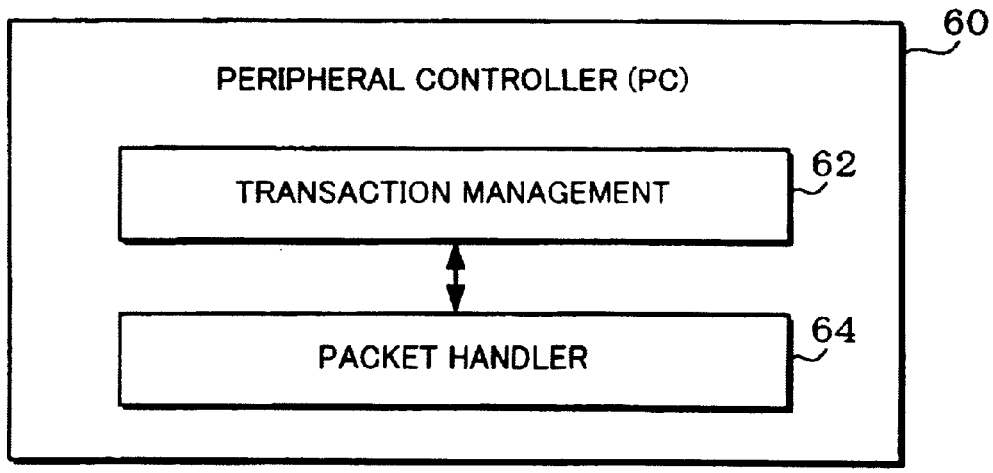

An example of the configuration of the peripheral controller 60 is shown in FIG. 20B.

The peripheral controller 60 includes a transaction management circuit 62 and a packet handler circuit 64. The transaction management circuit 62 and the packet handler circuit 64 perform substantially the same processing as the transaction management circuit 56 and the packet handler circuit 58 of the host controller 50.

9.3 Buffer Controller

Figure 21:
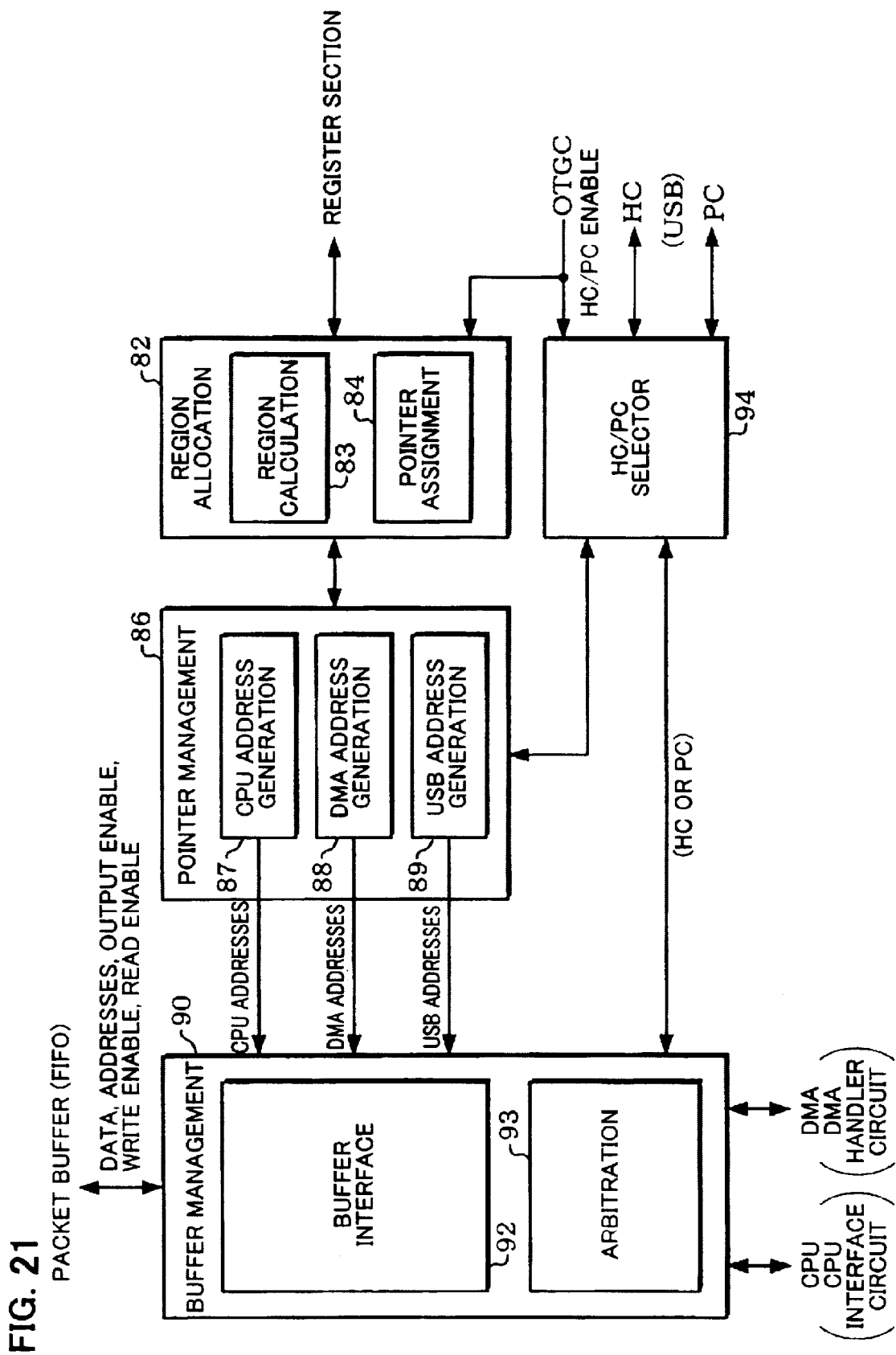
FIG. 21 shows a detailed example of the configuration of the buffer controller.

An example of the configuration of the buffer controller 80 is shown in FIG. 21.

The buffer controller 80 includes a region allocation circuit 82. This region allocation circuit 82 is a circuit that allocates the buffer region in the packet buffer 100 (a region in which pipe regions are set during the host operation or endpoint regions are set during the peripheral operation).

The region allocation circuit 82 includes a region calculation circuit 83. This region calculation circuit 83 is a circuit that calculates the region size, start address, and end address of the buffer region, based on the maximum packet size (broadly speaking: the page size) and the number of pages.

Figure 22:
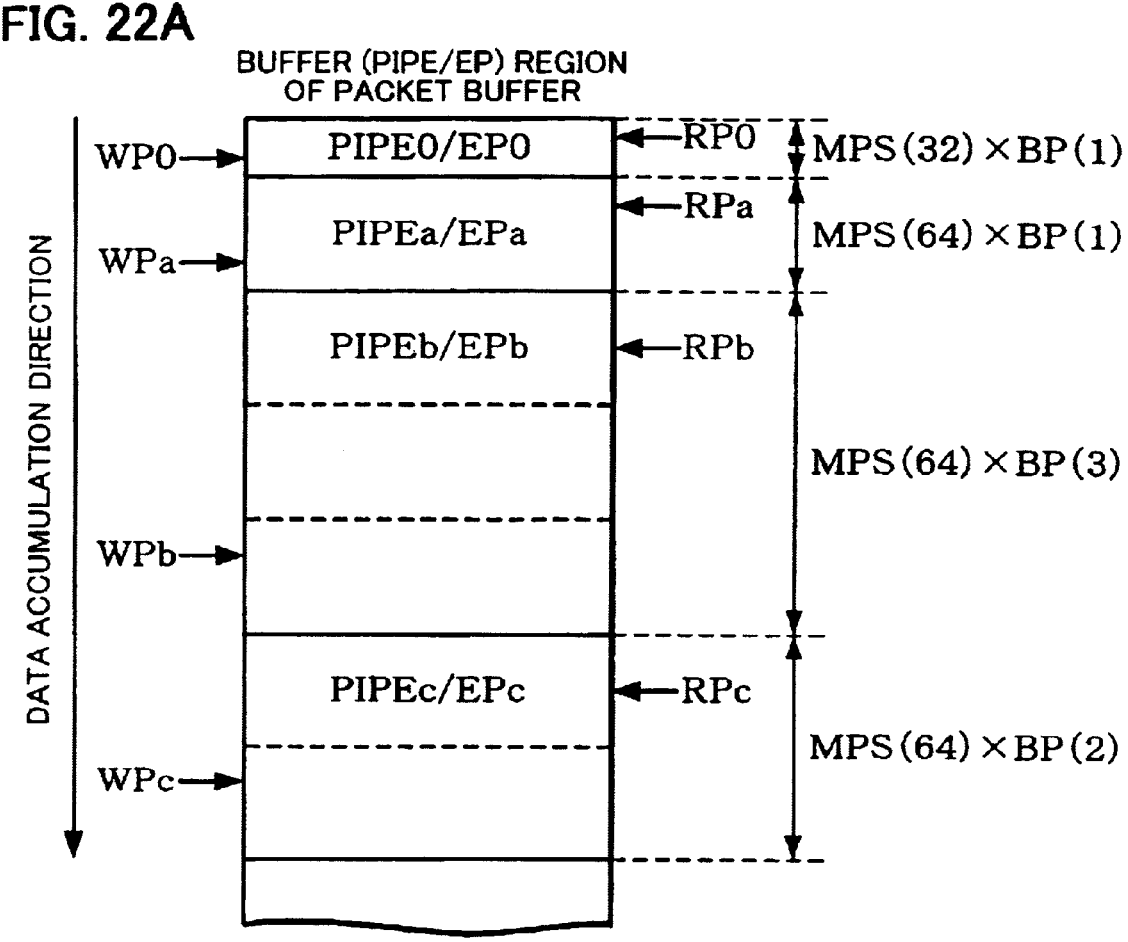
FIGS. 22A, 22B, and 22C are illustrative of the region allocation method and the pointer assignment method.

Assume, by way of example, that a maximum packet size (MaxPktSize) of 32, 64, 64, and 64 bytes is set for each of the buffer regions PIPE0/EP0, PIPEa/EPa, PIPEb/EPb, and PIPEc/EPc shown in FIG. 22A and the number of pages (BufferPage) is set to 1, 1, 3, and 2 pages, respectively. The region calculation circuit 83 calculates the region sizes, start addresses, and end addresses of these buffer regions PIPE0/EP0 to PIPEc/EPc, based on data such as these maximum packet sizes and numbers of pages. In the example shown in FIG. 22A, the region sizes of PIPE0/EP0, PIPEa/EPa, PIPEb/EPb, and PIPEc/EPc are calculated to be 32 (=32×1), 64 (=64×1), 192 (=64×3), and 128 (=64×2) bytes, respectively.

A pointer assignment circuit 84 is a circuit that assigns write pointers WP (WP0, WPa, WPb, WPc) and read pointers RP (RP0, RPa, RPb, RPc) for each buffer region, to DMA pointers, CPU pointers, and USB pointers.

For data transmission (transfer of data from the DMA or CPU to the USB side through the packet buffer 100) when DMA transfer is used, as shown in FIG. 22B by way of example, the write pointer WP of that buffer region is assigned to the pointer for DMA (DMA access) and the read pointer RP is assigned to the pointer for USB (USB access). For data transmission when CPU (PIO) transfer is used, the write pointer WP of that buffer region is assigned to the pointer for CPU (CPU access) and the read pointer RP is assigned to the pointer for USB.

For data reception (transfer of data from USB to the DMA or CPU through the packet buffer 100) when DMA transfer is used, as shown in FIG. 22C, the write pointer WP of that buffer region is assigned to the USB pointer and the read pointer RP is assigned to the DMA pointer. Similarly, for data reception when CPU transfer is used, the write pointer WP of that buffer region is assigned to the USB pointer and the read pointer RP is assigned to the CPU pointer.

Note that the pointer information (position information) for the write pointer WP and read pointer RP of each buffer region is stored in the transfer condition registers (PIPE/EP registers) of the register section 70.

A pointer management circuit 86 is a circuit for creating actual addresses for access to the packet buffer 100, while updating the pointers.

The pointer management circuit 86 includes a CPU address generation circuit 87, a DMA address generation circuit 88, and a USB address generation circuit 89. These address generation circuits 87, 88, and 89 generate CPU addresses, DMA addresses, and USB addresses, based on the CPU pointer, DMA pointer, and USB pointer assigned by the pointer assignment circuit 84. They also update the pointers at each access from the CPU (CPU interface circuit) or DMA (DMA handler circuit) and at each transaction end (handshake transmission/reception such as ACK or NAK). Note that post-update pointer information is overwritten into the transfer condition registers of the register section 70 through the region allocation circuit 82.

A buffer management circuit 90 is a circuit that manages accesses to the packet buffer 100.

The buffer management circuit 90 includes a buffer interface circuit 92. This buffer interface circuit 92 receives data such as CPU addresses, DMA addresses, and USB addresses from the pointer management circuit 86, performs input-output to the packet buffer 100, and outputs data such as addresses, output enable, write enable, and read enable.

The buffer management circuit 90 also includes an arbitration circuit 93. This arbitration circuit 93 is a circuit that arbitrates accesses from the CPU (CPU interface circuit), DMA (DMA handler circuit), and USB (host controller or peripheral controller). A CPU address, DMA address, or USB address is output as an access address for the packet buffer 100, based on this arbitration result, to set a data transfer path between the CPU, DMA, or USB and the packet buffer 100.

An HC/PC selector 94 performs switching control of the connection between the buffer management circuit 90 (the buffer controller 80) and either the host controller 50 (HC) or the peripheral controller 60 (PC). During the host operation, it connects the host controller 50 and the buffer management circuit 90, and during the peripheral operation, it connects the peripheral controller 60 and the buffer management circuit 90. Note that this connection switching control is based on an HC/PC enable signal from the OTG controller (OTCG) 20.

10. Firmware Processing

The description now turns to a detailed example of the processing of the firmware (processing section).

Figure 23:
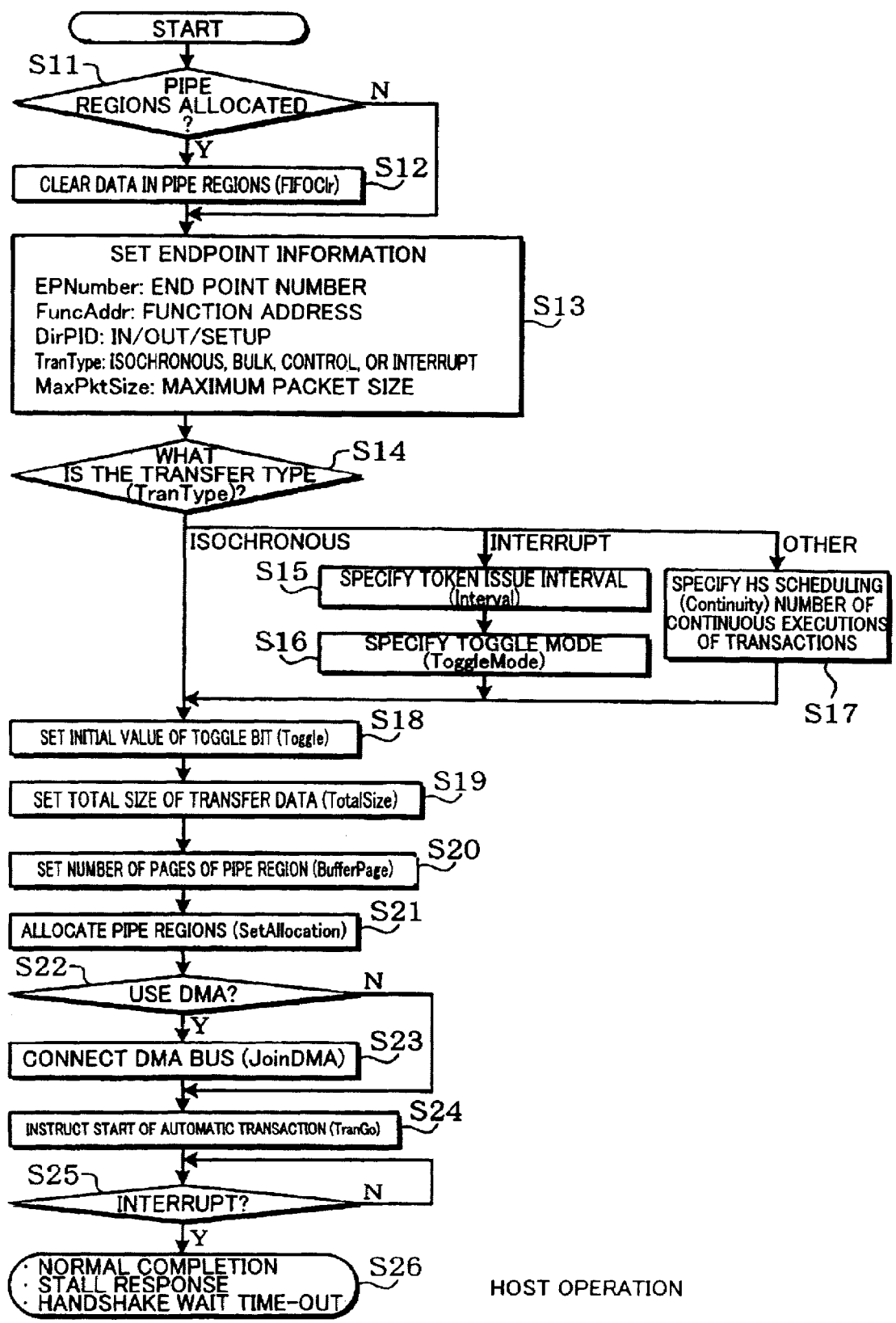
FIG. 23 is a flowchart of a detailed example of the processing of the firmware during host operation.

A flowchart of the processing during the host operation is shown in FIG. 23.

First of all, the system determines whether or not pipe (buffer) regions have already been allocated (step S11) and, if they have been allocated, it issues the clear data instruction (FIFOClr) for the pipe regions (step S12).

It then sets endpoint (transfer condition) information in the transfer condition registers (step S13). In other words, it sets data such as the endpoint number (EPNumber), function address (FuncAddr), transfer direction such as IN/OUT/SETUP (DirPID), transfer type such as isochronous, bulk, control, or interrupt (TranType), and maximum packet size (MaxPktSize).

It then determines the transfer type (TranType) (step S14) and, if the transfer type is isochronous, it branches to step S18. If the transfer type is interrupt transfer, it specifies the token issue period (Interval) and also specifies toggle mode (ToggleMode) (steps S15 and S16). If the transfer type is neither isochronous nor interrupt (bulk or control), it specifies the HC scheduling (number of continuous executions of transactions: Continuity) (step S17).

It then sets the toggle bit (Toggle) to its initial value and sets the total size (TotalSize) of the transfer data (steps S18 and S19). Note that it is not necessary to set the initial value of the toggle bit for isochronous transfer. In addition, steps S13 to S19 can be done in any order.

The system then sets the number of pages (BufferPage) of the pipe (buffer) region (step S20), and issues the pipe region allocation instruction (SetAllocation) (step S21).

It then determines whether or not DMA is to be used and, if it is to be used, instructs (JoinDMA) connection to the DMA bus (steps S22 and S23). It then instructs the start of the automatic transaction (TranGo) (step S24).

It waits for the issue of an interrupt (step S25), then performs processing such as normal end, STALL response, or handshake wait time-out (step S26).

Figure 24:
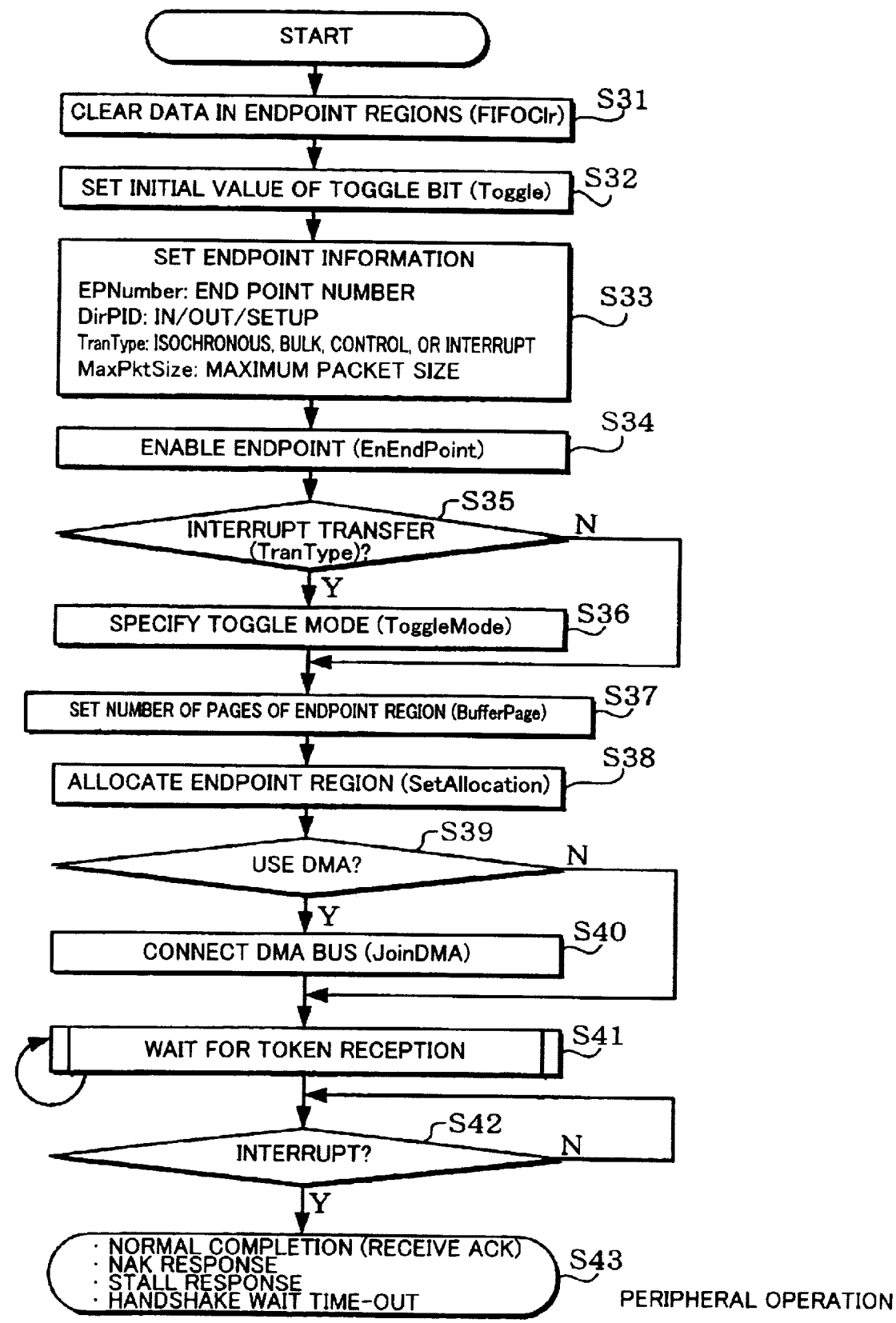
FIG. 24 is a flowchart of a detailed example of the processing of the firmware during peripheral operation.

A flowchart of the processing during the peripheral operation is shown in FIG. 24.

The system first issues the clear data instruction (FIFOClr) for the endpoint (buffer) regions (step S31). It also sets the initial value of the toggle bit (Toggle) (step S32).

It then sets endpoint (transfer condition) information (step S33). In other words, it sets details such as the endpoint number (EPNumber), transfer direction (DirPID), transfer type (TranType), and maximum packet size (MaxPktSize).

It then issues an endpoint enable instruction (EnEndPoint) (step S34). It determines the transfer type (TranType) and, if it is an interrupt transfer, it specifies toggle mode (ToggleMode) (steps S35 and S36).

It then sets the number of pages (BufferPage) for the endpoint (buffer) region (step S37), and issues the endpoint region allocation instruction (SetAllocation) (step S38).

It then determines whether or not DMA is to be used and, if it is to be used, instructs (JoinDMA) connection to the DMA bus (steps S39 and S40).

It then goes into a state in which it waits for a token to be received from the host (step S41). It waits for the issue of an interrupt (step S42), then performs processing such as normal end, NAK response, STALL response, or handshake wait time-out (step S43).

11. Electronic Equipment

The description now turns to examples of electronic equipment including the data transfer control device of this embodiment of the invention.

Figure 25A:
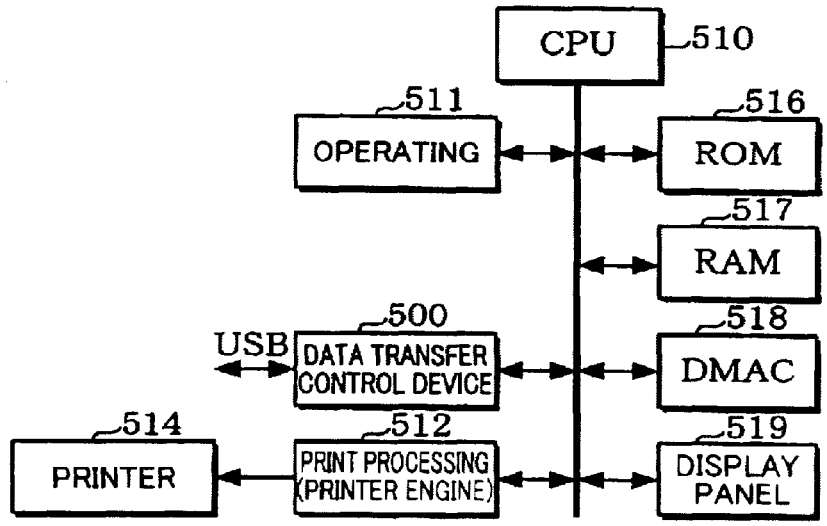
FIGS. 25A, 25B, and 25C are internal block diagrams of various items of electronic equipment.
Figure 26A:
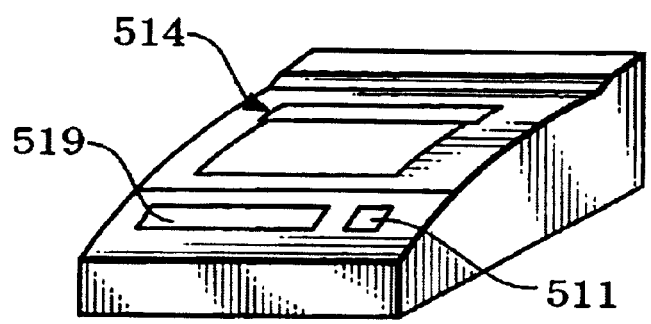
FIGS. 26A, and 26B, and 26C are external views of various items of electronic equipment.

An internal block diagram of a printer that is one example of such electronic equipment is shown in FIG. 25A with an external view thereof being shown in FIG. 26A. A CPU 510 (processing section) has various functions, including that of controlling the entire system. An operating section 511 is designed to enable the user to operate the printer. Data such as a control program and fonts is stored in a ROM 516, and a RAM 517 (system memory) functions as a work area for the CPU 510. A DMAC 518 is a DMA controller for transferring data through the CPU 510. A display panel 519 is designed to inform the user of the operational state of the printer.

Serial print data that has been sent in from another device such as a personal computer, digital camera, or digital video camera via USB is converted into parallel print data by a data transfer control device 500. The thus converted parallel print data is sent to a print processing section (a printer engine) 512 by the CPU 510 or the DMAC 518. This parallel print data is subjected to given processing in the print processing section 512 and is output for printing to paper by a printer section (a device for outputting data) 514 including components such as a print head.

Figure 25B:
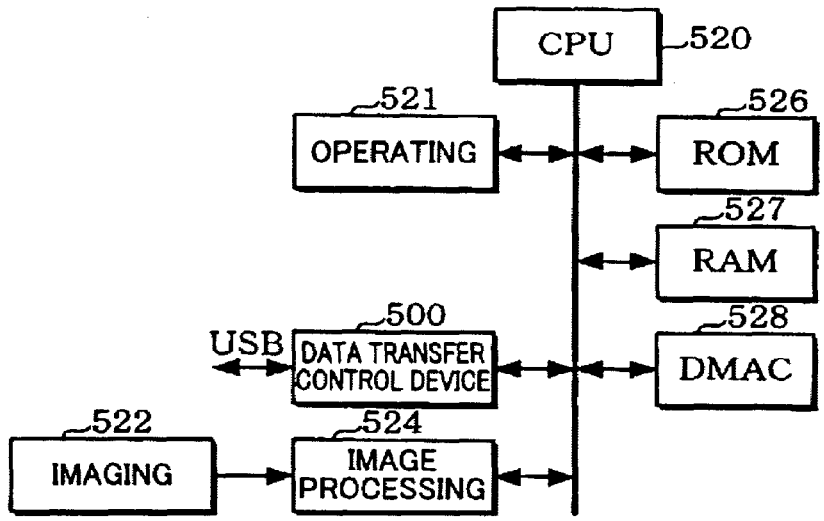
Figure 26B:
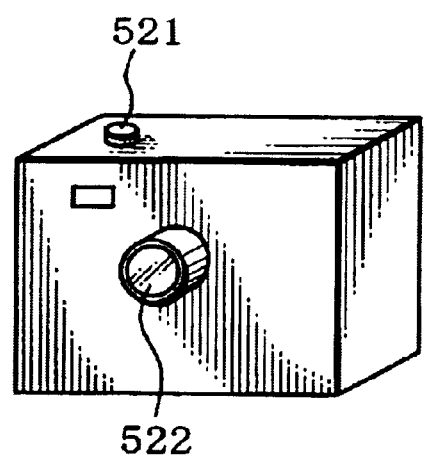

An internal block diagram of a digital camera that is another example of electronic equipment is shown in FIG. 25B with an external view thereof being shown in FIG. 26B.

A CPU 520 has various functions, including that of controlling the entire system. An operating section 521 (including controls such as a shutter button and operating buttons) is designed to enable the user to operate the digital camera. Data such as a control program is stored in a ROM 526, and a RAM 527 functions as a work area for the CPU 520. A DMAC 528 is a DMA controller.

An image of a document is captured by an image capture section (a device for fetching data) 522, which includes components such as a CCD and lens, and data of the captured image is processed by an image processing section 524. The processed image data is sent to the data transfer control device 500 by the CPU 520 or DMAC 528. The data transfer control device 500 converts that parallel image data into serial data and sends it to another device such as a printer, storage device, or personal computer via USB.

Figure 25C:
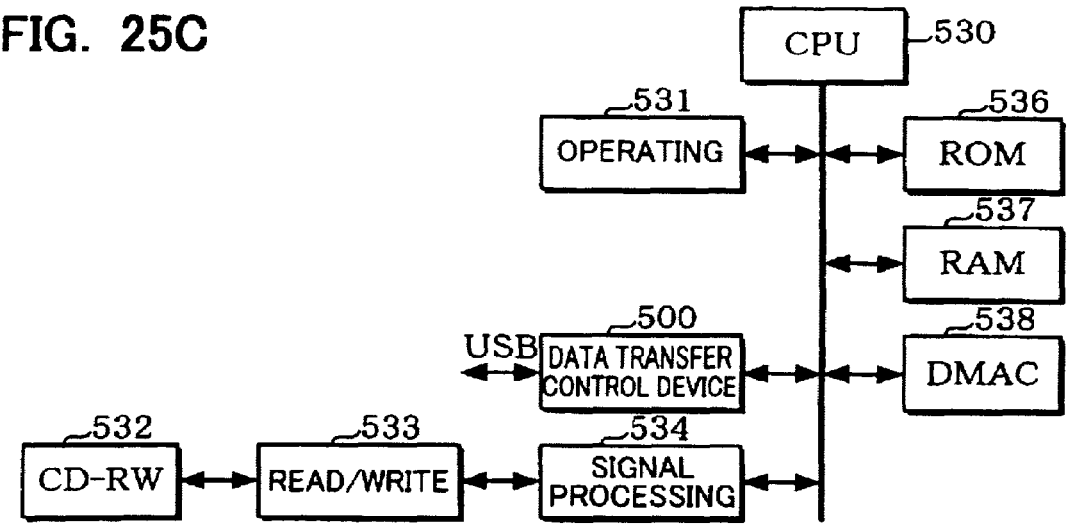
Figure 26C:
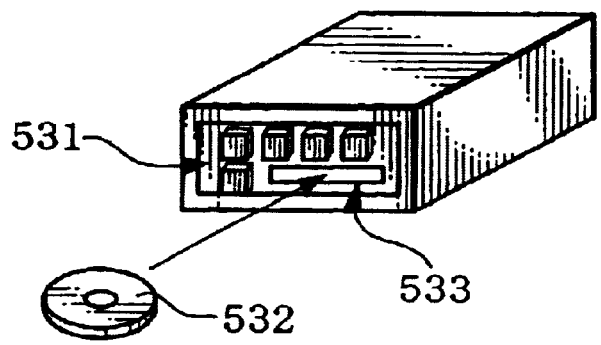

An internal block diagram of a CD-RW drive that is a further example of electronic equipment is shown in FIG. 25C with an external view thereof being shown in FIG. 26C. A CPU 530 has various functions, including that of controlling the entire system. An operating section 531 is designed to enable the user to operate the CD-RW drive. Data such as a control program is stored in a ROM 536, and a RAM 537 functions as a work area for the CPU 530. A DMAC 538 is a DMA controller.

Data read out from a CD-RW 532 by a read/write section (a device for fetching data or a device for storing data) 533, which including components such as a laser, a motor, and an optical system, is input to a signal processing section 534 where it is subjected to given signal processing such as error correction. The data that has been subjected to this signal processing is sent to the data transfer control device 500 by the CPU 530 or the DMAC 538. The data transfer control device 500 converts this parallel data into serial data, then sends it to another device via USB.

Serial data that comes in from another device via USB, on the other hand, is converted into parallel data by the data transfer control device 500. This parallel data is sent to the signal processing section 534 by the CPU 530 or the DMAC 538. This parallel print data is subjected to given signal processing by the signal processing section 534 then is stored by the read/write section 533 on the CD-RW 532.

Note that a separate CPU for controlling data transfer by the data transfer control device 500 could be provided in addition to the CPU 510, 520, or 530 of FIGS. 25A, 25B, and 25C.

Use of the data transfer control device of this embodiment of the present invention in electronic equipment makes it possible to implement electronic equipment having the OTG function. In other words, electronic equipment can be made to have the role of host and also the role of a device, enabling the development of applications that have not existed up until now.

Use of the data transfer control device of this embodiment in electronic equipment also makes it possible to reduce the processing load on the CPU (processing section) incorporated in the electronic equipment, thus making it possible to use an inexpensive CPU. The CPU can also be made to have some spare time for processing other than data transfer control processing, enabling an increase in the capabilities of the electronic equipment and a reduction in the cost thereof. This also makes it possible to simplify firmware programs operating on the CPU, thus shortening the development period of electronic equipment.

Note that electronic equipment that can employ the data transfer control device in accordance with this embodiment includes other types of electronic equipment such as various types of optical disk drive (CD-ROM or DVD), magneto-optic disk drives (MO), hard disk drives, digital video cameras, mobile phones, scanners, TVs, VCRs, audio equipment, telephones, projectors, personal computers, electronic notebooks, and dedicated wordprocessors.

Note also that the present invention is not limited to the embodiments described herein, and various modifications are possible within the scope of the invention laid out herein.

For example, the configuration of the data transfer control device in accordance with the present invention is preferably that as shown in FIG. 5, but it is not limited thereto.

The configurations of the various blocks of the data transfer control device (such as the HC, PC, and OTGC blocks) are also not limited to those described with reference to this embodiment, and thus various modifications are possible.

The transfer condition information that is set in the transfer condition registers is similarly not limited to the information described with reference to this embodiment.

Terminology (such as: maximum packet size, OTG controller, CPU/firmware, host controller or peripheral controller, USB, number of continuous executions of transactions, pipe region or endpoint region) that is derived from generic terminology defined within this document (such as: page size, state controller, processing section, transfer controller, bus, transfer ratio information, or buffer region) could be replaced by other terminology used within this document.

It is possible for an aspect of the present invention that is defined by a dependent claim to omit some of the configurational requirements of the corresponding antecedent claim. Similarly, the components of the present invention defined by one independent claim can also be allocated to other independent claims.

This embodiment has been described with reference to the application thereof to the USB OTG standard, but the applications of the present invention are not limited to the OTG standard. For example, the present invention can also be applied to data transfer in accordance with standards that are based on a similar concept to that of the OTG standard or those that are derived from the OTG standard.

What is claimed is:

1. A data transfer control device for data transfer over a bus, the data transfer control device comprising:

a buffer controller which controls access to a packet buffer including a plurality of pipe regions, each of the plurality of pipe regions being allocated to the packet buffer corresponding to one of a plurality of endpoints of a peripheral side, and data to be transferred to or from corresponding one of the endpoints of the peripheral side being stored in the plurality of pipe regions;

a register section which includes a plurality of registers, a page size and a number of pages of each of the plurality of pipe regions being set in corresponding one of the registers;

a transfer controller which transfers data between each of the plurality of pipe regions and corresponding one of the endpoints, a region size of each of the plurality of pipe regions being set by the page size and the number of pages, the plurality of pipe regions being allocated in the packet buffer simultaneously during a host operation, and the page size, and the number of pages of each of the plurality of pipe regions being set arbitrarily according to each of the endpoints.

2. The data transfer control device as defined by claim 1, the data transfer control device further comprising:

a state controller which controls a plurality of states including a state of a host operation, in which the data transfer control device operates as a role of a host, and a state of a peripheral operation, in which the data transfer control device operates as a role of a peripheral, wherein the page size and the number of pages are set in common registers that are used in common during the host operation and during the peripheral operation.

3. The data transfer control device as defined by claim 2, wherein during the host operation, a plurality of pipe regions is allocated in the packet buffer, each of the pipe regions storing data to be transferred to or from corresponding one of the endpoints, and a page size and a number of pages of each of the pipe regions are set in corresponding one of the common registers, and wherein during the peripheral operation, a plurality of endpoint regions are allocated in the packet buffer, each of the endpoint regions storing data to be transferred between each of the endpoint regions and the host, and a page size and a number of pages of each of the endpoint regions are stored in corresponding one of the common registers.

4. The data transfer control device as defined by claim 1, wherein the register section comprises a plurality of transfer condition registers, transfer condition information for data transfer between the pipe regions and the respective endpoints being set in the transfer condition registers, respectively, and wherein the page size and the number of pages are set in the transfer condition registers as the transfer condition information.

5. The data transfer control device as defined by claim 4, wherein transfer type of a data transfer is set in the transfer condition registers as the transfer condition information.

6. The data transfer control device as defined by claim 4, wherein the transfer controller automatically issues a transaction for each of the endpoints, based on the transfer condition information that has been set in the transfer condition registers, and automatically transfers data between each of the pipe regions and corresponding one of the endpoints, a region size of each of the pipe regions being set by the page size and the number of pages.

7. The data transfer control device as defined by claim 1, wherein when the processing section sets the page size and the number of pages in the registers in the register section and instructs the allocation of pipe regions, the buffer controller allocates the pipe regions in the packet buffer, the region size of the pipe regions being set by the page size and the number of pages.

8. The data transfer control device as defined by claim 1, wherein the page size that is set in the register is a maximum page size.

9. The data transfer control device as defined by claim 1, wherein data transfer conforming to the universal serial bus (USB) on-the-go (OTG) standard is performed.

10. Electronic equipment comprising:

the data transfer control device as defined by claim 1;

a device which performs output processing, fetch processing, or storage processing on data to be transferred through the data transfer control device and bus; and a processing section which controls data transfer of the data transfer control device.

11. A data transfer control method for data transfer through a bus, the method comprising:

allocating a plurality of pipe regions in a packet buffer, data to be transferred between each of the plurality of pipe regions and corresponding to one of endpoints of a peripheral side being stored in the plurality of pipe regions;

setting a page size and a number of pages of each of the plurality of pipe regions in corresponding one register among a plurality of registers;

transferring data between each of the plurality of pipe regions and corresponding one of the endpoints, a region size of each of the plurality of pipe regions being set by the page size and the number of pages, and wherein the plurality of pipe regions being allocated in the packet buffer simultaneously during a host operation, and the page size and the number of pages of each of the plurality of pipe regions being set arbitrarily according to each of the endpoints.

* * * * *